(12) United States Patent
Howard et al.

(10) Patent No.: US 7,978,649 B2
(45) Date of Patent: Jul. 12, 2011

(54) UNIFIED MIMO TRANSMISSION AND RECEPTION

(75) Inventors: Steven J. Howard, Ashland, MA (US); Jay Rodney Walton, Carlisle, MA (US); Mark S. Wallace, Bedford, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 1203 days.

(21) Appl. No.: 10/892,732

(22) Filed: Jul. 15, 2004

(65) Prior Publication Data
US 2006/0013250 A1    Jan. 19, 2006

(51) Int. Cl.
*H04Q 7/00* (2006.01)
(52) U.S. Cl. .................. 370/329; 370/341; 375/267
(58) Field of Classification Search .................. 370/328, 370/329, 334; 375/267
See application file for complete search history.

(56) References Cited

U.S. PATENT DOCUMENTS

| | | | |
|---|---|---|---|
| 5,581,583 A | 12/1996 | Conti et al. | |
| 5,668,837 A | 9/1997 | Dent | |
| 5,757,845 A | 5/1998 | Fukawa et al. | |
| 6,144,711 A | 11/2000 | Raleigh et al. | |
| 6,175,743 B1 | 1/2001 | Alperovich et al. | |
| 6,198,775 B1 | 3/2001 | Khayrallah et al. | |
| 6,218,985 B1 | 4/2001 | Adams | |
| 6,298,035 B1 | 10/2001 | Heiskala | |
| 6,314,147 B1 | 11/2001 | Liang et al. | |
| 6,351,499 B1 | 2/2002 | Paulraj et al. | |
| 6,441,786 B1 | 8/2002 | Jasper et al. | |
| 6,452,981 B1 | 9/2002 | Raleigh et al. | |
| 6,473,467 B1 | 10/2002 | Wallace et al. | |
| 6,477,161 B1 * | 11/2002 | Hudson et al. | 370/342 |
| 6,486,828 B1 * | 11/2002 | Cahn et al. | 342/363 |
| 6,496,535 B2 | 12/2002 | Xu | |
| 6,542,556 B1 | 4/2003 | Kuchi et al. | |

(Continued)

FOREIGN PATENT DOCUMENTS

CN    1476695 A    2/2004

(Continued)

OTHER PUBLICATIONS

International Search Report—PCT/US05/024615, International Search Authority—European Patent Office, Nov. 4, 2005.

(Continued)

*Primary Examiner* — William Trost, IV
*Assistant Examiner* — Roberta A Shand
(74) *Attorney, Agent, or Firm* — QUALCOMM Patent Group; Thien T. Nguyen; James H. Yancey, Jr.

(57) ABSTRACT

A "unified" MIMO system that supports multiple operating modes for efficient data transmission is described. Each operating mode is associated with different spatial processing at a transmitting entity. For example, four operating modes may be defined for (1) full-CSI or partial-CSI transmission and (2) with or without steering transmit diversity (STD). An appropriate operating mode may be selected for use based on various factors (e.g., availability of a good channel estimate). With steering transmit diversity, data is spatially spread and transmitted on multiple spatial channels, and a single rate may then be used for all spatial channels used for data transmission. A receiving entity may utilize a minimum mean square error (MMSE) technique for all operating modes. The receiving entity may derive a spatial filter matrix and perform receiver spatial processing in the same manner for all operating modes, albeit with different effective channel response matrices.

15 Claims, 10 Drawing Sheets

U.S. PATENT DOCUMENTS

| | | |
|---|---|---|
| 6,618,454 B1 | 9/2003 | Agrawal et al. |
| 6,642,888 B2 | 11/2003 | Kishigami et al. |
| 6,678,263 B1 | 1/2004 | Hammons, Jr. et al. |
| 6,711,124 B2 | 3/2004 | Khayrallah et al. |
| 6,711,528 B2 | 3/2004 | Dishman et al. |
| 6,760,388 B2 | 7/2004 | Ketchum et al. |
| 6,763,073 B2 | 7/2004 | Foschini et al. |
| 6,788,661 B1 * | 9/2004 | Ylitalo et al. ............... 370/334 |
| 6,801,790 B2 * | 10/2004 | Rudrapatna ............... 455/562.1 |
| 6,804,307 B1 | 10/2004 | Popovic |
| 6,816,555 B2 | 11/2004 | Sakoda |
| 6,842,487 B1 | 1/2005 | Larsson |
| 6,847,306 B2 | 1/2005 | Diba et al. |
| 6,862,271 B2 | 3/2005 | Medvedev et al. |
| 6,937,189 B2 | 8/2005 | Kim |
| 6,940,917 B2 | 9/2005 | Menon et al. |
| 6,956,897 B1 | 10/2005 | Honig |
| 6,975,668 B2 | 12/2005 | Zhang |
| 6,982,946 B2 | 1/2006 | Wiberg et al. |
| 6,999,472 B2 | 2/2006 | Hamalainen et al. |
| 7,020,110 B2 | 3/2006 | Walton et al. |
| 7,020,490 B2 | 3/2006 | Khatri |
| 7,031,669 B2 | 4/2006 | Vaidyanathan et al. |
| 7,057,555 B2 | 6/2006 | Lewis |
| 7,061,969 B2 | 6/2006 | Alamouti et al. |
| 7,065,156 B1 | 6/2006 | Kuchi |
| 7,079,870 B2 | 7/2006 | Vaidyanathan |
| 7,095,709 B2 | 8/2006 | Walton et al. |
| 7,095,987 B2 | 8/2006 | Brothers, Jr. et al. |
| 7,099,678 B2 | 8/2006 | Vaidyanathan |
| 7,099,698 B2 * | 8/2006 | Tarokh et al. ............... 455/562.1 |
| 7,110,378 B2 | 9/2006 | Onggosanusi et al. |
| 7,110,463 B2 | 9/2006 | Wallace et al. |
| 7,130,580 B2 | 10/2006 | Alexiou et al. |
| 7,149,254 B2 | 12/2006 | Sampath |
| 7,151,809 B2 | 12/2006 | Ketchum et al. |
| 7,190,734 B2 | 3/2007 | Giannakis et al. |
| 7,194,042 B2 | 3/2007 | Walton et al. |
| 7,200,631 B2 | 4/2007 | Mailaender et al. |
| 7,227,906 B2 | 6/2007 | Fukuda et al. |
| 7,292,623 B2 | 11/2007 | Reznik |
| 7,302,009 B2 | 11/2007 | Walton et al. |
| 7,317,750 B2 | 1/2008 | Shattil |
| 7,324,429 B2 | 1/2008 | Walton et al. |
| 7,324,482 B2 | 1/2008 | Hammons, Jr. et al. |
| 7,327,798 B2 | 2/2008 | Won |
| 7,336,746 B2 | 2/2008 | Walton et al. |
| 7,356,073 B2 | 4/2008 | Heikkila |
| 7,359,466 B2 | 4/2008 | Huang et al. |
| 7,385,617 B2 | 6/2008 | Tahat |
| 7,394,754 B2 | 7/2008 | Li et al. |
| 7,436,896 B2 | 10/2008 | Hottinen et al. |
| 7,447,268 B2 | 11/2008 | Sadowsky et al. |
| 7,529,177 B2 | 5/2009 | Celebi et al. |
| 7,583,747 B1 | 9/2009 | Damen et al. |
| 7,593,317 B2 | 9/2009 | Yuda et al. |
| 2002/0114269 A1 | 8/2002 | Onggosanusi et al. |
| 2002/0127978 A1 * | 9/2002 | Khatri ............... 455/103 |
| 2002/0172264 A1 | 11/2002 | Wiberg et al. |
| 2002/0193146 A1 | 12/2002 | Wallace et al. |
| 2002/0196742 A1 | 12/2002 | Baker et al. |
| 2003/0011274 A1 | 1/2003 | Saint-Michel et al. |
| 2003/0016637 A1 | 1/2003 | Khayrallah et al. |
| 2003/0072254 A1 | 4/2003 | Ma et al. |
| 2003/0076908 A1 | 4/2003 | Huang et al. |
| 2003/0108117 A1 | 6/2003 | Ketchum et al. |
| 2003/0112745 A1 | 6/2003 | Zhuang et al. |
| 2003/0123565 A1 | 7/2003 | Fukuda et al. |
| 2003/0123567 A1 | 7/2003 | Shigemasa et al. |
| 2003/0128658 A1 | 7/2003 | Walton et al. |
| 2003/0161282 A1 | 8/2003 | Medvedev et al. |
| 2003/0186698 A1 | 10/2003 | Holma et al. |
| 2003/0204380 A1 | 10/2003 | Dishman et al. |
| 2003/0228850 A1 | 12/2003 | Hwang |
| 2003/0235147 A1 | 12/2003 | Walton et al. |
| 2004/0002364 A1 | 1/2004 | Trikkonen et al. |
| 2004/0022183 A1 | 2/2004 | Lii et al. |
| 2004/0042439 A1 | 3/2004 | Menon et al. |
| 2004/0052315 A1 | 3/2004 | Thielecke et al. |
| 2004/0081263 A1 | 4/2004 | Lee et al. |
| 2004/0082356 A1 | 4/2004 | Walton et al. |
| 2004/0085939 A1 | 5/2004 | Wallace et al. |
| 2004/0086027 A1 | 5/2004 | Shattil et al. |
| 2004/0102157 A1 | 5/2004 | Lewis et al. |
| 2004/0136349 A1 | 7/2004 | Walton et al. |
| 2004/0139137 A1 | 7/2004 | Mailaender et al. |
| 2004/0248604 A1 | 12/2004 | Vaidyanathan et al. |
| 2005/0017511 A1 | 1/2005 | Dalton |
| 2005/0026570 A1 | 2/2005 | Han |
| 2005/0149320 A1 | 7/2005 | Kajala et al. |
| 2005/0175115 A1 | 8/2005 | Walton et al. |
| 2005/0180312 A1 | 8/2005 | Walton et al. |
| 2005/0195733 A1 | 9/2005 | Walton et al. |
| 2005/0220199 A1 | 10/2005 | Sadowsky et al. |
| 2005/0238111 A1 | 10/2005 | Wallace et al. |
| 2005/0249159 A1 | 11/2005 | Abraham et al. |
| 2005/0249174 A1 | 11/2005 | Lundby et al. |
| 2005/0265275 A1 | 12/2005 | Howard et al. |
| 2005/0276347 A1 | 12/2005 | Mujtaba et al. |
| 2006/0050770 A1 | 3/2006 | Wallace et al. |
| 2006/0067421 A1 | 3/2006 | Walton et al. |
| 2006/0234789 A1 | 10/2006 | Tarokh et al. |
| 2006/0274844 A1 | 12/2006 | Walton et al. |
| 2007/0009059 A1 | 1/2007 | Wallace et al. |
| 2008/0031372 A1 | 2/2008 | Walton et al. |
| 2008/0031374 A1 | 2/2008 | Walton et al. |
| 2008/0095282 A1 | 4/2008 | Walton et al. |
| 2008/0273617 A1 | 11/2008 | Lundby et al. |

FOREIGN PATENT DOCUMENTS

| | | |
|---|---|---|
| EP | 0752793 A2 | 1/1997 |
| EP | 0905920 A2 | 3/1999 |
| EP | 1009124 A2 | 6/2000 |
| EP | 1073214 | 1/2001 |
| EP | 1185001 | 3/2002 |
| EP | 1220506 | 7/2002 |
| EP | 1223702 A1 | 7/2002 |
| EP | 1241824 | 9/2002 |
| EP | 1361686 | 11/2003 |
| EP | 1396956 | 3/2004 |
| JP | 11-205026 | 7/1999 |
| JP | 2002-503048 | 1/2002 |
| JP | 2002524972 | 8/2002 |
| JP | 2003530010 | 10/2003 |
| JP | 200423416 | 1/2004 |
| JP | 2004-064654 | 2/2004 |
| JP | 2004-072150 | 3/2004 |
| JP | 2004-096753 | 3/2004 |
| JP | 2004-104790 | 4/2004 |
| JP | 2005-524331 | 8/2005 |
| JP | 2007-515829 | 6/2007 |
| JP | 2007515131 | 6/2007 |
| JP | 2007-523549 | 8/2007 |
| JP | 2007-523550 | 8/2007 |
| JP | 2007527150 | 9/2007 |
| JP | 2007-529972 | 10/2007 |
| JP | 2007-538414 | 12/2007 |
| KR | 200260860 | 7/2002 |
| KR | 20060123496 | 12/2006 |
| RU | 2111619 | 5/1998 |
| RU | 2116698 | 7/1998 |
| RU | 2202152 | 4/2003 |
| WO | 9737456 | 10/1997 |
| WO | WO0156218 A1 | 2/2001 |
| WO | 0176110 | 10/2001 |
| WO | 0225857 | 3/2002 |
| WO | WO 02/078211 A2 | 10/2002 |
| WO | 03015334 | 2/2003 |
| WO | 03041300 | 5/2003 |
| WO | WO03050968 | 6/2003 |
| WO | 03058871 | 7/2003 |
| WO | 03063526 | 7/2003 |
| WO | WO03056742 A1 | 7/2003 |
| WO | WO03071711 | 8/2003 |
| WO | 03094386 | 11/2003 |
| WO | 2004002011 | 12/2003 |
| WO | 2004002047 | 12/2003 |

| | | |
|---|---|---|
| WO | WO03101029 | 12/2003 |
| WO | WO2004021605 | 3/2004 |
| WO | WO 2004/038984 A2 | 5/2004 |
| WO | WO 2004/038985 A2 | 5/2004 |
| WO | WO2004038987 | 5/2004 |
| WO | WO2004039011 A2 | 5/2004 |
| WO | WO2005060192 | 6/2005 |
| WO | 2005099211 | 10/2005 |

OTHER PUBLICATIONS

Written Opinion—PCT/US05/024615, International Search Authority—European Patent Office, Nov. 4, 2005.
International Preliminary Report on Patentability-PCT/US05/024615. International Bureau of WIPO—Geneva Switzerland-Jan. 4, 2007.
Agustin et al., "LDC Construction With a Defined Structure,"Vehicular Technology Conference, XP010700754, Oct. (2003).
Alamouti, "A Simple Transmit Diversity Technique for Wireless Communications," IEEE Journal on Select Areas in Communications, vol. 16, No. 8, Oct. 1998, pp. 1451-1458.
B.M Hochwald et al., "Systematic Design of Unitary Space-Time Constellations,"IEEE Trans. on it,vol. 46, No. 6, Sep. 2000.
Bem et al., "Smart Antennas for Mobile Communications Systems," International Conference on Microwaves, Radar and Wireless Communications, vol. 3, May 22, 2000, pp. 120-130, XP010537479.
Bourdoux et al., "Non-reciprocal transceivers in OFDM/SDMA Systems: Impact and Mitigation," Radio and Wireless Conference, Aug. 10, 2003, pp. 183-186, XP010656728.
Bruhl et al., "Investigation of Front-end Requirements for MIMO-Systems Using Downlink Pre-Distortion," European Personal Mobile Communications Conference, 2003, pp. 472-476, XP002330243.
Crow, I.: "The Fourier Matrix," Apr. 27, 2001, http://www.maths.abdn.ac.uk/~igc/tch/mx4002/notes/node91.html, pp. 1-3.
Dammann, et al., "Beamforming in Combination with Space-Time Diversity for Broadband OFDM Systems," IEEE International Conference on Communications, 2002. ICC 2002. New York, NY, Apr. 28-May 2, 2002, vol. 1, pp. 165-171.
Jungnickel et al., "A Mimo System with Reciprocal Transceivers for the Time-division Duplex Mode,"Antennas and Propagation Society International Symposium, vol. 2, Jun. 20, 2004, pp. 1267-1270, XP010721570.
Kaiser, "Spatial Transmit Diversity Techniques for Broadband OFDM Systems," IEEE Global Telecommunications Conference, 2000. GLOBECOM '00. San Francisco, CA, Nov. 27-Dec. 1, 2000, vol. 3, pp. 1824-1828.
Laroia R et al., "Enhanced Opportunistic Beamforming," Vehicular Technology Conference, 2003. VTC 2003-Fall. IEEE.58th Orlando, FL, USA Oct. 6-9, 2003, pp. 1762-1766, XP01072878.
Liu et al., "OFDM-MIMO WLAN AP Front-end Gain and Phase Mismatch Calibration," IEEE Radio and Wireless Conference, Sep. 2004, pp. 151-154, XP002330244.
Narula, et al., "Performance Limits of Coded Diversity Methods for Transmitter Antenna Arrays," IEEE Transactions on Information Theory, vol. 45, No. 7, Nov. 1999, pp. 2418-2433.
Pan, et al., "Dynamic Sub-channel Allocation with Adaptive Beamforming for Broadband OFDM Wireless Systems," IEEE Global Telecommunications Conference, 2002. Globecom '02. Taipei, Taiwan, Nov. 17-21, 2002, New York, NY, Nov. 17, 2002, vol. 1, pp. 711-715.
T.L. Marzetta, B. Hassibi, B.M Hochwald, "Structured Unitary Space-Time Autocoding Constellations,"IEEE Trans. on it,vol. 48, No. 4, Apr. 2002.
IEEE Std. 802.11a-1999, Part 11: Wireless LAN Medium Access Control (MAC) and Physical Layer (PHY) Specifications, Amendment 1: High-Speed Physical Layer in the 5 GHz Band.
IEEE Std. 802.11g-2003, Part 11: Wireless LAN Medium Access Control (MAC) and Physical Layer (PHY) Specifications, Amendment 4: Further Higher Data Rate Extension in the 2.4 GHz Band.
"Part 11: Wireless LAN Medium Access Control (MAC) and Physical Layer (PHY) Specifications: High-Speed Physical Layer in the 5GHz Band," IEEE Standards 802.11a, Sep. 1999.

Auer, G., Channel Estimation for OFDM With Cyclic Delay Diversity, Personal, Indoor and Mobile Radio Communications, 2004. PIMRC 2004, 15TH IEEE International Symposium on, Sep. 5, 2004, vol. 3, pp. 1792-1796.
Bauch, G. et al., Orthogonal Frequency Division Multiple Access With Cyclic Delay Diversity, Smart Antennas, 2004, ITG Workshop on, Mar. 18, 2004, pp. 17-24.
Masoud Sharif, Babak Hassibi, on the Capacity of Mimo Broadcast Channel With Partial Side Information, Signals, Systems and Computers, 2003, Conference Record of the Thirty Seventh Asilomar Conference, Nov. 12, 2003.
IEEE Personal Communications, Dec. 2003, Jack H. Winters, Smart antennas for wireless systems.
Antenna-Theory.com, "Steering Vector", http://www.antenna-theory.com, pp. 1,, No date given. (Cited by USPTO Examiner in U.S. Appl. No. 10/821,390 on Jan. 11, 2011).
Doonstnejad et al, " Space-time Spreading Codes for a Multiuser MIMO System," Institute of Electrical and Electronics Engineers, Conference Record of the 36th. Asilomar conference on Signals, Systems, & Computers, Pacific Grove, California, Nov. 3-6, 2002, pp. 1374-1378, XP10638423.
Farrokhi et al., "Link-Optimal Space-Time Processing with Multiple Transmit and Receive Antennas," IEE E Communications Letters, vol. 5, No. 5, pp. 684-705, Jun. 2003.
Goldsmith et al., "Capacity Limits of MIMO Channels," IEEE Journal on Slected Areas in Communications, vol. 21, No. 5, pp. 684-702, Jun. 2003.
Hanzo et al., Single And Multi-Carrier Ds-CDMA, "Space-Time Spreading Aided Single-Carrier Wideband CDMA Communicating Over Multipath Nakagami Fading Channels," Chapter 8, pp. 279-310, John Wiley & Sons, England, 2003 (XP-002357231).
Hochwald et al., "a Trnasmitter Diversity Scheme for Wideband CDMA Systems based on Space-time Spreading", Selected Areas in Communications, vol. 19, No. 1, Jan. 2001.
Hochwald et al., "Unitary Space-Time Modulation For Multiple-Antenna Communications in Rayleigh Flat Fading," IEEE Transactions On Information Theory, vol. 46, No. 2, pp. 543-564 (2000).
Ketchum, John et al., "PHY Design for Spatial Multiplexing MIMO WLAN," IEEE 802.11-04/0721r0, IEEE, Jul. 2004, pp. 1-33 (Spatial Spreading Mode, Intrinsic Transmission Mode).
Li, et al., "Transmit Diversity Over Quasi-Static Fading Channels Using Multiple Antennas And Random Signal Mapping," IEEE Transaction On Communications, vol. 51, No. 11, Nov. 2003, pp. 1918-1926.
Liu, Jung-Tao: " Successive decoding of multiple space time coded streams in multi-input multi-output systems," Global Telecommunications Conference, 2002. Globecom '02. IEEE, USA, Nov. 21, 2002, 1007-1011 vol. 1.
Marzetta et al., "Structured Unitary Space-Time Autocoding Constellations," IEEE Transactions On Information Theory, vol. 48, No. 4, Apr. 2002, pp . 942-950.
Medles et al., "Multistream Space-Time Coding by Spatial Spreading, Scrambling and Delay Diveersity," IEEE International Conference on Acoustics, Speech and Signal Processing, vol. 4 of 4, XP-10803892, pp. 2429-2432 (2002).
Sharif et al., "On the Capacity of MIMO Broadcast Channel with Partial Side Information", Department of Electrical Engineering, CA Institute of Engineering, IEEE 2002, pp. 958-962.
Suthaharan et al.: Space-time coded MIMI-OFDM for high capacity and high data-rate wireless communication over frequency selective fading channels, Mobile and Wireless Communications Networks, 2002. 4th International Workshop on USA, Sep. 11, 2002, 424-428.
Yao, Huan, "Efficient Signal, Code, and Receiver Designs of MIMO Communication Systems," PH.D. Thesis, Massachusetts Institute of Technology, Cambridge, Massachusetts, 2003.
Yu and Cioffi, "Trellis Precoding For The Broadcast Channel,"IEEE Global Telecommunications, Conference, vol. 2, Electricla Engineering Department, Stanford, University, Stanford, Californai (2001), pp. 1344-1348.

* cited by examiner

UNIFIED MIMO TRANSMISSION AND RECEPTION

BACKGROUND

I. Field

The present invention relates generally to communication, and more specifically to data transmission in a multiple-input multiple-output (MIMO) communication system.

II. Background

A MIMO system employs multiple ($N_T$) transmit antennas at a transmitting entity and multiple ($N_R$) receive antennas at a receiving entity for data transmission. A MIMO channel formed by the $N_T$ transmit antennas and $N_R$ receive antennas may be decomposed into $N_S$ spatial channels, where $N_S \leq \min\{N_T, N_R\}$. The $N_S$ spatial channels may be used to transmit data in parallel to achieve higher throughput and/or redundantly to achieve greater reliability.

Each spatial channel may experience various deleterious channel conditions such as, e.g., fading, multipath, and interference effects. The $N_S$ spatial channels may also experience different channel conditions and may achieve different signal-to-noise-and-interference ratios (SNRs). The SNR of each spatial channel determines its transmission capacity, which is typically quantified by a particular data rate that may be reliably transmitted on the spatial channel. For a time variant wireless channel, the channel conditions change over time and the SNR of each spatial channel also changes over time. The different SNRs for different spatial channels plus the time varying nature of the SNR for each spatial channel make it challenging to efficiently transmit data in a MIMO system.

If the transmitting entity has knowledge of the channel condition, then it may transmit data in a manner to more fully utilize the transmission capacity of each spatial channel. However, if the transmitting entity does not know the channel condition, then it may need to transmit data at a low rate so that the data transmission can be reliably decoded by the receiving entity even with the worst-case channel condition. Performance would then be dictated by the expected worst-case channel condition, which is highly undesirable.

There is therefore a need in the art for techniques to efficiently transmit data in a MIMO system.

SUMMARY

A "unified" MIMO system that supports multiple operating modes for efficient data transmission is described herein. Each operating mode is associated with different spatial processing at a transmitting entity. At least one operating mode utilizes steering transmit diversity (STD). For STD, the transmitting entity performs spatial processing with multiple steering matrices to transmit data on multiple spatial channels. As a result, a single rate may be used for all spatial channels for the operating modes with STD.

The transmitting entity selects an operating mode from among the multiple operating modes, e.g., based on the availability of a reasonably accurate channel estimate. The transmitting entity performs spatial processing for data transmission in accordance with the selected operating mode. The receiving entity may utilize various receiver spatial processing techniques to recover data sent by the transmitting entity. The receiving entity may utilize a minimum mean square error (MMSE) technique for all operating modes. For the MMSE technique, the receiving entity may derive a spatial filter matrix and perform receiver spatial processing in the same manner for all operating modes. However, different effective channel response matrices are used to derive the spatial filter matrix for different operating modes, as described below.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
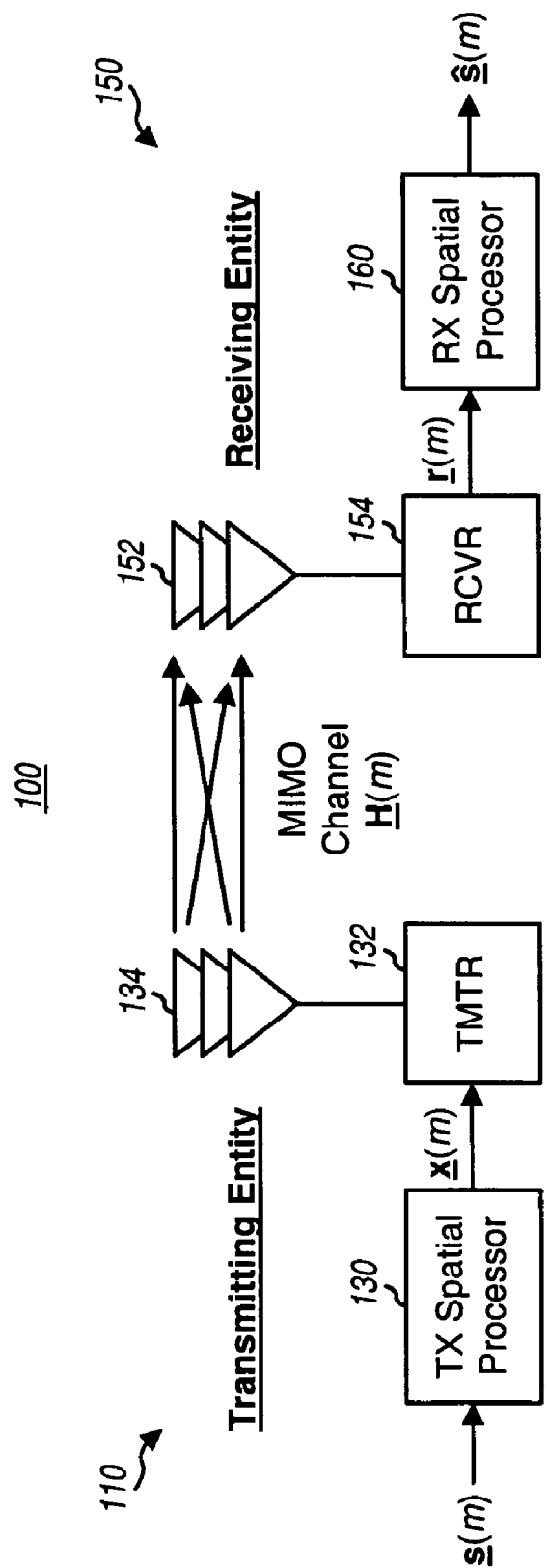
FIG. 1 shows a block diagram of a transmitting entity and a receiving entity.

FIG. 1 shows a simple block diagram of a transmitting entity 110 and a receiving entity 150 in a MIMO system 100. At transmitting entity 110, a TX spatial processor 130 performs spatial processing on data symbols (denoted by a vector s(m)) in accordance with a selected operating mode to generate transmit symbols (denoted by a vector x(m)). As used herein, a "data symbol" is a modulation symbol for data, a "pilot symbol" is a modulation symbol for pilot (which is data that is known a priori by both the transmitting and receiving entities), a "transmit symbol" is a symbol to be sent from a transmit antenna, a "received symbol" is a symbol obtained from a receive antenna, and a modulation symbol is a complex value for a point in a signal constellation used for a modulation scheme (e.g., M-PSK, M-QAM, and so on). The transmit symbols are further conditioned by a transmitter unit (TMTR) 132 to generate $N_T$ modulated signals, which are transmitted from $N_T$ transmit antennas 134 and via a MIMO channel.

At receiving entity 150, the transmitted modulated signals are received by $N_R$ receive antennas 152, and the $N_R$ received signals are conditioned by a receiver unit (RCVR) 154 to obtain received symbols (denoted by a vector r(m)). An RX spatial processor 160 performs receiver spatial processing (or spatial matched filtering) on the received symbols with spatial filter matrices to obtain "detected" data symbols (denoted by a vector ŝ(m)), which are estimates of the data symbols sent by transmitting entity 110. The spatial processing at the transmitting and receiving entities are described below.

The MIMO system supports data transmission using multiple operating modes. Each operating mode utilizes different spatial processing at the transmitting and/or receiving entity. In an embodiment, each operating mode (1) utilizes either full-CSI or partial-CSI transmission and (2) either employs or does not employ steering transmit diversity (STD). With STD, the transmitting entity performs spatial processing with steering matrices so that a data transmission observes an ensemble of effective channels and is not stuck on a single bad channel realization for an extended period of time. Consequently, performance is not dictated by the worst-case channel condition. Table 1 summarizes the four operating modes for the MIMO system.

TABLE 1

Operating Modes

| | Full-CSI Transmission | Partial-CSI Transmission |
|---|---|---|
| No STD | Data is transmitted on eigenmodes without STD | Data is transmitted on spatial channels without STD |
| STD | Data is transmitted on eigenmodes with STD | Data is transmitted on spatial channels with STD |

For full-CSI transmission, data is transmitted on orthogonal spatial channels (or "eigenmodes") of a MIMO channel. For partial-CSI transmission, data is transmitted on spatial channels of the MIMO channel (e.g., from individual transmit antennas). Full-CSI transmission may provide better performance and may be used if the transmitting entity has information to send data on the eigenmodes. Partial-CSI transmission may be used with very little information (e.g., one or more rates to use for data transmission). The MIMO system may support different and/or other operating modes. For example, the MIMO system may also support a beam-steering mode and/or a beam-forming mode that utilize a single (best) spatial channel for data transmission.

Figure 2:
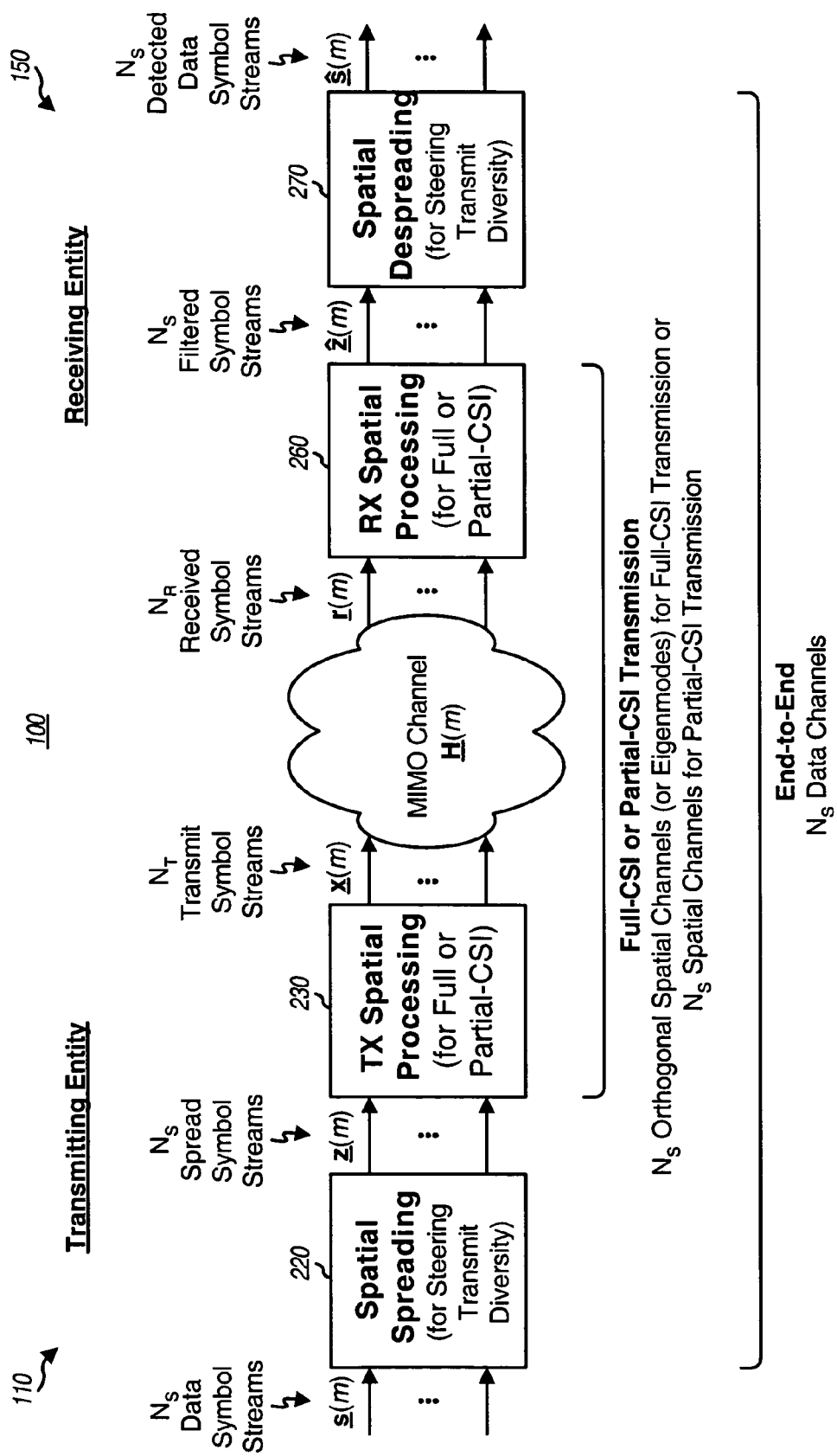
FIG. 2 shows a model for data transmission for the four operating modes.

FIG. 2 shows a data transmission model for the four operating modes shown in Table 1. The transmitting entity may perform spatial processing (or "spatial spreading") on data symbols $\underline{s}(m)$ for STD to obtain spread symbols $\underline{z}(m)$ (block 220). The transmitting entity also performs spatial processing on the spread symbols $\underline{z}(m)$ for either full-CSI or partial-CSI transmission to obtain transmit symbols $\underline{x}(m)$ (block 230). The receiving entity performs receiver spatial processing (or spatial matched filtering) on received symbols $\underline{r}(m)$ for full-CSI or partial-CSI transmission to obtain filtered symbols $\underline{\hat{z}}(m)$, which are estimates of the spread symbols $\underline{z}(m)$ (block 260). The receiving entity may also perform receiver spatial processing (or "spatial despreading") on the filtered symbols $\underline{\hat{z}}(m)$ to obtain detected data symbols $\underline{\hat{s}}(m)$ (block 270).

As shown in FIG. 2, the transmitting entity may perform spatial spreading prior to the spatial processing for full-CSI or partial-CSI transmission. The receiving entity may perform the complementary spatial matched filtering for full-CSI or partial-CSI transmission followed by spatial despreading. The receiving entity may also jointly perform the spatial matched filtering and spatial despreading.

As also shown in FIG. 2, $N_S$ data symbol streams may be sent on $N_S$ "data" channels. Each data channel is an effective channel observed by a data symbol stream between an element of $\underline{s}(m)$ at the transmitting entity and a corresponding element of $\underline{\hat{s}}(m)$ at the receiving entity. The l-th data channel is thus the effective channel between the l-th element of $\underline{s}(m)$ and the l-th element of $\underline{\hat{s}}(m)$. STD randomizes the $N_S$ data channels. $N_S$ spread symbol streams (if STD is utilized) or $N_S$ data symbol streams (if STD is not utilized) may be sent on $N_S$ spatial channels of the MIMO channel for both full-CSI and partial-CSI transmissions. For full-CSI transmission, the $N_S$ spatial channels are orthogonal to one another and are called eigenmodes.

1. Full-CSI Transmission with Steering Transmit Diversity

In MIMO system 100, the MIMO channel formed by the $N_T$ transmit antennas at transmitting entity 110 and the $N_R$ receive antennas at receiving entity 150 may be characterized by an $N_R \times N_T$ channel response matrix $\underline{H}(m)$, which may be given as:

$$\underline{H}(m) = \begin{bmatrix} h_{1,1}(m) & h_{1,2}(m) & \ldots & h_{1,N_T}(m) \\ h_{2,1}(m) & h_{2,2}(m) & \ldots & h_{2,N_T}(m) \\ \vdots & \vdots & \ddots & \vdots \\ h_{N_R,1}(m) & h_{N_R,2}(m) & \ldots & h_{N_R,N_T}(m) \end{bmatrix},$$
Eq (1)

where entry $h_{i,j}(m)$, for $i=1 \ldots N_R$ and $j=1 \ldots N_T$, denotes the coupling or complex channel gain between transmit antenna j and receive antenna i for transmission span m. A transmission span may cover time and/or frequency dimensions. For example, in a single-carrier MIMO system, a transmission span may correspond to one symbol period, which is the time interval to transmit one data symbol. In a multi-carrier MIMO system, a transmission span may correspond to one frequency subband in one symbol period. A transmission span may also cover multiple symbol periods and/or multiple subbands. For simplicity, the MIMO channel is assumed to be full rank with $N_S = N_T \leq N_R$.

For full-CSI transmission, eigenvalue decomposition may be performed on a correlation matrix of $\underline{H}(m)$ to obtain $N_S$ eigenmodes of $\underline{H}(m)$, as follows:

$$\underline{R}(m) = \underline{H}^H(m) \cdot \underline{H}(m) = \underline{E}(m) \cdot \underline{\Lambda}(m) \cdot \underline{E}^H(m),$$
Eq(2)

where $\underline{R}(m)$ is an $N_T \times N_T$ correlation matrix of $\underline{H}(m)$;
$\underline{E}(m)$ is an $N_T \times N_T$ unitary matrix whose columns are eigenvectors of $\underline{R}(m)$;
$\underline{\Lambda}(m)$ is an $N_T \times N_T$ diagonal matrix of eigenvalues of $\underline{R}(m)$; and
"$H$" denotes a conjugate transpose.

A unitary matrix $\underline{U}$ is characterized by the property $\underline{U}^H \cdot \underline{U} = \underline{I}$, where $\underline{I}$ is the identity matrix. The columns of a unitary matrix are orthogonal to one another, and each column has unit power. The matrix $\underline{E}(m)$ is also called the "eigenmode" matrix or the "transmit" matrix and may be used for spatial processing by the transmitting entity to transmit data on the $N_S$ eigenmodes of $\underline{H}(m)$. The eigenmodes may be viewed as orthogonal spatial channels obtained through decomposition. The diagonal entries of $\underline{\Lambda}(m)$ are eigenvalues of $\underline{R}(m)$, which represent the power gains for the $N_S$ eigenmodes. Singular value decomposition may also be performed to obtain matrices of left and right eigenvectors, which may be used for full-CSI transmission.

The transmitting entity may perform spatial processing for full-CSI transmission with STD, as follows:

$$\underline{x}_f^s(m) = \underline{E}(m) \cdot \underline{V}(m) \cdot \underline{s}(m),$$
Eq (3)

where $\underline{s}(m)$ is a vector with up to $N_S$ data symbols to be sent in transmission span m;
$\underline{V}(m)$ is a unitary steering matrix for transmission span m;
$\underline{x}_f^s(m)$ is a vector with $N_T$ transmit symbols to be sent from the $N_T$ transmit antennas in transmission span m.

In general, $N_D$ data symbols may be sent simultaneously on $N_D$ (best) eigenmodes of the MIMO channel, where $1 \leq N_D \leq N_S$. The $N_D$ data symbols in $\underline{s}(m)$ are spatially spread with an $N_D \times N_D$ steering matrix $\underline{V}(m)$ to obtain $N_D$ spread symbols. Each spread symbol includes a component of each of the $N_D$ data symbols. The $N_D$ spread symbols are then transmitted on the $N_D$ eigenmodes of $\underline{H}(m)$. The steering matrix $\underline{V}(m)$ may be generated as described below.

The receiving entity obtains received symbols from the $N_R$ receive antennas, which may be expressed as:

$$\underline{r}_f^s(m) = \underline{H}(m) \cdot \underline{x}_f^s(m) + \underline{n}(m) \qquad \text{Eq (4)}$$
$$= \underline{H}(m) \cdot \underline{E}(m) \cdot \underline{V}(m) \cdot \underline{s}(m) + \underline{n}(m),$$
$$= \underline{H}_{f\_eff}^s(m) \cdot \underline{s}(m) + \underline{n}(m),$$

where $\underline{r}_f^s(m)$ is a vector with $N_R$ received symbols in transmission span m;
$\underline{n}(m)$ is a noise vector for transmission span m; and
$\underline{H}_{f\_eff}^s(m)$ is an $N_R \times N_T$ "effective" channel response matrix observed by the data vector s(m) with full-CSI transmission and STD, which is:

$$\underline{H}_{f\_eff}^s(m) = \underline{H}(m) \cdot \underline{E}(m) \cdot \underline{V}(m) \qquad \text{Eq (5)}$$

For simplicity, the noise is assumed to be additive white Gaussian noise (AWGN) with a zero mean vector and a covariance matrix of $\phi_{nn} = \sigma^2 \cdot \underline{I}$, where $\sigma^2$ is the variance of the noise and $\underline{I}$ is the identity matrix.

The receiving entity can recover the data symbols in s(m) using various receiver processing techniques. The techniques applicable for full-CSI transmission include a full-CSI technique and the MMSE technique.

For the full-CSI technique, the receiving entity may derive a spatial filter matrix $\underline{M}_{fcsi}^s(m)$, as follows:

$$\underline{M}_{fcsi}^s(m) = \underline{V}^H(m) \cdot \underline{\Lambda}^{-1}(m) \cdot \underline{E}^H(m) \cdot \underline{H}^H(m). \qquad \text{Eq (6)}$$

The receiving entity may perform receiver spatial processing using $\underline{M}_{fcsi}^s(m)$, as follows:

$$\hat{\underline{s}}_{fcsi}^s(m) = \underline{M}_{fcsi}^s(m) \cdot \underline{r}_f^s(m), \qquad \text{Eq (7)}$$
$$= \underline{V}^H(m) \cdot \underline{\Lambda}^{-1}(m) \cdot \underline{E}^H(m) \cdot \underline{H}^H(m) \cdot$$
$$[\underline{H}(m) \cdot \underline{E}(m) \cdot \underline{V}(m) \cdot \underline{s}(m) + \underline{n}(m)],$$
$$= \underline{s}(m) + \underline{n}_{fcsi}^s(m),$$

where $\hat{\underline{s}}_{fcsi}^s(m)$ is a vector with $N_S$ detected data symbols; and
$\underline{n}_{fcsi}^s(m)$ is the post-detection noise after the full-CSI processing.

For the MMSE technique, the receiving entity may derive a spatial filter matrix $\underline{M}_{f\_mmse}^s(m)$, as follows:

$$\underline{M}_{f\_mmse}^s(m) = [\underline{H}_{f\_eff}^{s\,H}(m) \cdot \underline{H}_{f\_eff}^s(m) + \sigma^2 \cdot \underline{I}]^{-1} \cdot \underline{H}_{f\_eff}^{s\,H}(m) \qquad \text{Eq (8)}$$

The spatial filter matrix $\underline{M}_{f\_mmse}^s(m)$ minimizes the mean square error between the symbol estimates from the spatial filter and the data symbols in s(m).

The receiving entity may perform MMSE spatial processing, as follows:

$$\hat{\underline{s}}_{f\_mmse}^s(m) = \underline{D}_{f\_mmse}^{s\,-1}(m) \cdot \underline{M}_{f\_mmse}^s(m) \cdot \underline{r}_f^s(m), \qquad \text{Eq (9)}$$
$$= \underline{D}_{f\_mmse}^{s\,-1}(m) \cdot \underline{M}_{f\_mmse}^s(m) \cdot$$
$$[\underline{H}_{f\_eff}^s(m) \cdot \underline{s}(m) + \underline{n}(m)],$$
$$= \underline{D}_{f\_mmse}^{s\,-1}(m) \cdot \underline{M}_{f\_mmse}^s(m) \cdot$$
$$\underline{H}_{f\_eff}^s(m) \cdot \underline{s}(m) + \underline{n}_{f\_mmse}^s(m),$$

where $\underline{D}_{f\_mmse}^s(m)$ is a diagonal matrix containing the diagonal elements of the matrix $[\underline{M}_{f\_mmse}^s(m) \cdot \underline{H}_{f\_eff}^s(m)]$, or $\underline{D}_{f\_mmse}^s(m) = \text{diag}[\underline{M}_{f\_mmse}^s(m) \cdot \underline{H}_{f\_eff}^s(m)]$; and
$\underline{n}_{f\_mmse}^s(m)$ is the MMSE filtered noise.

The symbol estimates from the spatial filter $\underline{M}_{f\_mmse}^s(m)$ are unnormalized estimates of the data symbols. The multiplication with the scaling matrix $\underline{D}_{f\_mmse}^s(m)$ provides normalized estimates of the data symbols.

Full-CSI transmission attempts to send data on the eigenmodes of $\underline{H}(m)$. However, a full-CSI data transmission may not be completely orthogonal due to, for example, an imperfect estimate of $\underline{H}(m)$, error in the eigenvalue decomposition, finite arithmetic precision, and so on. The MMSE technique can account for (or "clean up") loss of orthogonality in the full-CSI data transmission.

For STD in a MIMO system that utilizes orthogonal frequency division multiplexing (OFDM), $N_F$ steering matrices $\underline{V}(m)$ may be used for $N_F$ subbands created by OFDM. These $N_F$ steering matrices may be selected to have the following form:

$$\underline{V}(m) = \begin{bmatrix} b_1(m) & 0 & \cdots & 0 \\ 0 & b_2(m) & \cdots & 0 \\ \vdots & \vdots & \ddots & \vdots \\ 0 & 0 & \cdots & b_{N_T}(m) \end{bmatrix}, \text{ for } m = 1 \ldots N_F, \qquad \text{Eq (10)}$$

where $b_i(m)$ is a weight for subband m of transmit antenna i. The weights in the steering matrix $\underline{V}(m)$ for each subband m may be defined as follows:

$$b_i(m) = e^{j\frac{2\pi(i-1)(m-1)}{N_F}}, \text{ for } i = 1 \ldots N_T \text{ and } m = 1 \ldots N_F. \qquad \text{Eq (11)}$$

The weights shown in equation (11) correspond to a progressive phase shift across the $N_F$ subbands of each transmit antenna, with the phase shift changing at different rates for the $N_T$ transmit antennas. These weights effectively form a different beam for each subband for a linear array of $N_T$ equally spaced transmit antennas. Spatial spreading may thus be performed in the frequency domain or the time domain. Spatial spreading may be performed in the frequency domain by multiplying $N_F$ data symbols $s_i(1)$ through $s_i(N_F)$ for $N_F$ subbands of each transmit antenna i with $N_F$ weights $b_i(1)$ through $b_i(N_F)$ for that antenna. Equivalently, spatial spreading may be performed in the time domain by (1) performing an $N_F$-point inverse discrete Fourier transform (IDFT) on $N_F$ spatially processed symbols for each transmit antenna i to obtain $N_F$ time-domain samples for that transmit antenna and (2) performing a circular shift of the $N_F$ time-domain samples for each transmit antenna i by i samples.

2. Partial-CSI Transmission with Steering Transmit Diversity

For partial-CSI transmission with STD, the transmitting entity may perform spatial processing as follows:

$$\underline{x}_p^s(m) = \underline{V}(m) \cdot \underline{s}(m), \qquad \text{Eq (12)}$$

where $\underline{x}_p^s(m)$ is the transmit data vector for transmission span m. As shown in equation (12), each data symbol in s(m) is spatially spread with a respective column of $\underline{V}(m)$. The $N_T$ spread symbols are then transmitted from the $N_T$ transmit antennas.

The receiving entity obtains received symbols, which may be expressed as:

$$r_p^s(m) = H(m) \cdot x_p^s(m) + n(m)$$
$$= H(m) \cdot V(m) \cdot s(m) + n(m),$$
$$= H_{p\_eff}^s(m) \cdot s(m) + n(m),$$

Eq (13)

where $r_p^s(m)$ is the received symbol vector for transmission span m; and
$H_{p\_eff}^s(m)$ is an $N_R \times N_T$ effective channel response matrix observed by s(m) for partial-CSI transmission with STD, which is:

$$H_{p\_eff}^s(m) = H(m) \cdot V(m)$$

Eq (14)

The receiving entity can recover the data symbols in s(m) using various receiver processing techniques. The techniques applicable for partial-CSI transmission include a channel correlation matrix inversion (CCMI) technique (which is also commonly called a zero-forcing technique) and the MMSE technique.

For the CCMI technique, the receiving entity may derive a spatial filter matrix $M_{ccmi}^s(m)$, as follows:

$$M_{ccmi}^s(m) = [H_{p\_eff}^{sH}(m) \cdot H_{p\_eff}^s(m)]^{-1} \cdot H_{p\_eff}^{sH}(m) = R_{p\_eff}^{s^{-1}}(m) \cdot H_{p\_eff}^{sH}(m)$$

Eq (15)

The receiving entity may perform CCMI spatial processing, as follows:

$$\hat{s}_{ccmi}^s(m) = M_{ccmi}^s(m) \cdot r_p^s(m),$$
$$= R_{p\_eff}^{s-1}(m) \cdot H_{p\_eff}^{sH}(m) \cdot [H_{p\_eff}^s(m) \cdot s(m) + n(m)],$$
$$= s(m) + n_{ccmi}^s(m),$$

Eq (16)

where $n_{ccmi}^s(m)$ is the CCMI filtered noise. Due to the structure of $R_{p\_eff}^s(m)$, the CCMI technique may amplify the noise.

For the MMSE technique, the receiving entity may derive a spatial filter matrix $M_{p\_mmse}^s(m)$, as follows:

$$M_{p\_mmse}^s(m) = [H_{p\_eff}^{sH}(m) \cdot H_{peff}^s(m) + \sigma^2 I]^{-1} \cdot H_{p\_eff}^s(m)$$

Eq (17)

Equation (17) for partial-CSI transmission has the same form as equation (8) for full-CSI transmission. However, $H_{p\_eff}^s(m)$ (instead of $H_{f\_eff}^s(m)$) is used in equation (17) for partial-CSI transmission.

The receiving entity may perform MMSE spatial processing, as follows:

$$\hat{s}_{p\_mmse}^s(m) = D_{p\_mmse}^{s-1}(m) \cdot M_{p\_mmse}^s(m) \cdot r_p^s(m),$$
$$= D_{p\_mmse}^{s-1}(m) \cdot M_{p\_mmse}^s(m) \cdot$$
$$H_{p\_eff}^s(m) \cdot s(m) + n_{p\_mmse}^s(m),$$

Eq (18)

where $D_{p\_mmse}^s(m) = \text{diag }[M_{p\_mmse}^s(m) \cdot H_{p\_eff}^s(m)]$ and $n_{p\_mmse}^s(m)$ is the MMSE filtered noise for partial-CSI transmission.

A successive interference cancellation (SIC) technique may also be used for both full-CSI and partial-CSI transmission. For the SIC technique, the receiving entity recovers the data symbols in s(m) in successive stages. For clarity, the following description assumes that each element of s(m) and each element of r(m) corresponds to one data symbol stream, where r(m) may be $r_f^s(m)$ or $r_p^s(m)$. The receiving entity processes the $N_R$ received symbol streams in r(m) in $N_S$ successive stages to recover the $N_S$ data symbol streams in s(m). Typically, the SIC processing is such that one packet is recovered for one stream, and then another packet is recovered for another stream, and so on. For simplicity, the following description assumes $N_S = N_T$.

For each stage l, where l=1 ... $N_S$, the receiving entity performs receiver spatial processing on $N_R$ input symbol streams $r^l(m)$ for that stage. The input symbol streams for the first stage (l=1) are the received symbol streams, or $r^1(m) = r(m)$. The input symbol streams for each subsequent stage (l=2 ... $N_S$) are modified symbol streams from a preceding stage. The receiver spatial processing for stage l is based on a spatial filter matrix $M^l(m)$, which may be derived based on a reduced effective channel response matrix $H^l(m)$ and further in accordance with the CCMI, MMSE, or some other technique. $H^l(m)$ contains $N_S - l + 1$ columns in $H_{f\_eff}^s(m)$ or $H_{p\_eff}^s(m)$ corresponding to $N_S - l + 1$ data symbol streams not yet recovered in stage l. The receiving entity obtains one detected data symbol stream $\{\hat{s}_l\}$ for stage l and further processes (e.g., demodulates, deinterleaves, and decodes) this stream to obtain a corresponding decoded data stream $\{\hat{d}_l\}$.

The receiving entity next estimates the interference that data symbol stream $\{s_l\}$ causes to the other data symbol streams not yet recovered. To estimate the interference, the receiving entity processes (e.g., re-encodes, interleaves, and symbol maps) the decoded data stream $\{\hat{d}_l\}$ in the same manner performed by the transmitting entity for this stream and obtains a stream of "remodulated" symbols $\{\check{s}_l\}$, which is an estimate of the data symbol stream $\{s_l\}$ just recovered. The receiving entity then performs spatial processing on the remodulated symbol stream in the same manner performed by the transmitting entity and further multiplies the result with the channel response matrices H(m) to obtain $N_R$ interference components $i^l(m)$ caused by stream $\{s_l\}$. The receiving entity then subtracts the $N_R$ interference components $i^l(m)$ from the $N_R$ input symbol streams $r^l(m)$ for the current stage l to obtain $N_R$ input symbol streams $r^{l+1}(m)$ for the next stage, or $r^{l+1}(m) = r^l(m) - i^l(m)$. The input symbol streams $r^{l+1}(m)$ represent the streams that the receiving entity would have received if the data symbol stream $\{s_l\}$ had not been transmitted, assuming that the interference cancellation was effectively performed. The receiving entity then repeats the same processing on the $N_R$ input symbol streams $r^{l+1}(m)$ to recover another data stream. However, the effective channel response matrix $H^{l+1}(m)$ for the subsequent stage l+1 is reduced by one column corresponding to the data symbol stream $\{s_l\}$ recovered in stage l.

For the SIC technique, the SNR of each data symbol stream is dependent on (1) the receiver processing technique (e.g., CCMI or MMSE) used for each stage, (2) the specific stage in which the data symbol stream is recovered, and (3) the amount of interference due to the data symbol streams recovered in later stages. In general, the SNR progressively improves for data symbol streams recovered in later stages because the interference from data symbol streams recovered in prior stages is canceled. This may then allow higher rates to be used for data symbol streams recovered in later stages.

The spatial processing at the transmitting and receiving entities for full-CSI and partial-CSI transmissions without STD is similar to that described above for full-CSI and partial-CSI transmissions with STD. However, the steering matrix V(m) is omitted from the equations when STD is not employed.

Table 2 summarizes the spatial processing at the transmitting and receiving entities for the four operating modes. For clarity, the index "(m)" for transmission span is not shown in Table 2. The SIC technique may be used for both full-CSI and partial-CSI transmissions but is not shown in Table 2.

the elements in the channel response matrix. The receiving entity may also compute $\underline{H}_{p\_eff}^{s}$ based on $\underline{H}$ (block 314a) or may obtain $\underline{H}$ based on $\underline{H}_{p\_eff}^{s}$ (block 314b).

TABLE 2

| | Full-CSI Transmission | | Partial-CSI Transmission | |
| --- | --- | --- | --- | --- |
| | no STD | STD | no STD | STD |
| Transmitter | $\underline{x}_f^n = \underline{E} \cdot \underline{s}$ | $\underline{x}_f^s = \underline{E} \cdot \underline{V} \cdot \underline{s}$ | $\underline{x}_p^n = \underline{s}$ | $\underline{x}_p^s = \underline{v} \cdot \underline{s}$ |
| Effective Channel | $\underline{H}_{f\_eff}^n = \underline{H} \cdot \underline{E}$ | $\underline{H}_{f\_eff}^s = \underline{H} \cdot \underline{E} \cdot \underline{V}$ | $\underline{H}_{p\_eff}^n = \underline{H}$ | $\underline{H}_{p\_eff}^s = \underline{H} \cdot \underline{V}$ |
| Received Symbols | | $\underline{r}_x^z = \underline{H} \cdot \underline{x}_x^z + \underline{n} = \underline{H}_{x\_eff}^z \cdot \underline{s} + \underline{n}$ | | |
| Receiver full-CSI/ CCMI | $\underline{M}_{fcsi}^n = \underline{\Lambda}^{-1}\underline{E}^H\underline{E}^H$ $\hat{\underline{s}}_{fcsi}^z = \underline{M}_{fcsi}^z \cdot \underline{r}_f^z$ | $\underline{M}_{fcsi}^s = \underline{V}^H\underline{M}_{fcsi}^n$ | $\underline{M}_{ccmi}^n = [\underline{H}^H\underline{H}]^{-1}\underline{H}^H$ $\hat{\underline{s}}_{ccmi}^z = \underline{M}_{ccmi}^z \cdot \underline{r}_p^z$ | $\underline{M}_{ccmi}^s = \underline{V}^H\underline{M}_{ccmi}^n$ |
| Receiver MMSE | | $\underline{M}_{x\_mmse}^z = [\underline{H}_{x\_eff}^{z\ H} \cdot \underline{H}_{x\_eff}^z + \sigma^2 \cdot \underline{I}]^{-1} \cdot \underline{H}_{x\_eff}^{z\ H}$ $\underline{D}_{x\_mmse}^z = \text{diag}[\underline{M}_{x\_mmse}^z \cdot \underline{H}_{x\_eff}^z]$ $\hat{\underline{s}}_{x\_mmse}^z = \underline{D}_{x\_mmse}^z \cdot \underline{M}_{x\_mmse}^z \cdot \underline{r}_x^z$ | | |

In Table 2, the subscript "x" may be "f" for full-CSI transmission or "p" for partial-CSI transmission, and the subscript "z" may be "s" for STD or "n" for no STD. For the full-CSI and CCMI techniques, the spatial filter matrix with STD may be derived based on (1) the spatial filter matrix without STD and (2) the steering matrix $\underline{V}$. The MMSE technique may be used for all four operating modes. The MMSE spatial filter matrix $\underline{M}_{x\_mmse}^z$ may be derived in the same manner for all four operating modes, albeit with different effective channel response matrices $\underline{H}_{f\_eff}^n$, $\underline{H}_{f\_eff}^s$, $\underline{H}_{p\_eff}^n$, and $\underline{H}_{p\_eff}^s$. The MMSE receiver spatial processing may also be performed in the same manner for all four operating modes, albeit with the MMSE spatial filter matrix being derived with different effective channel response matrices. An MMSE-based receiver may thus support all four operating modes using the same MMSE spatial processing.

The MMSE spatial filter matrix may also be derived as:

$$\underline{M}_{x\_mmse}^z = \underline{H}_{x\_eff}^{z\ H} \cdot [\underline{H}_{x\_eff}^z \cdot \underline{H}_{x\_eff}^{z\ H} + \sigma^2 \cdot \underline{I}]^{-1}.$$

The term $\sigma^2 \cdot \underline{I}$ may be replaced with the covariance matrix $\underline{\phi}_{nn}$ of the noise, if known.

3. Data and Pilot Transmission

Data and pilot may be transmitted in various manners for the four operating modes. Some exemplary pilot and data transmission schemes are described below.

Figure 3:
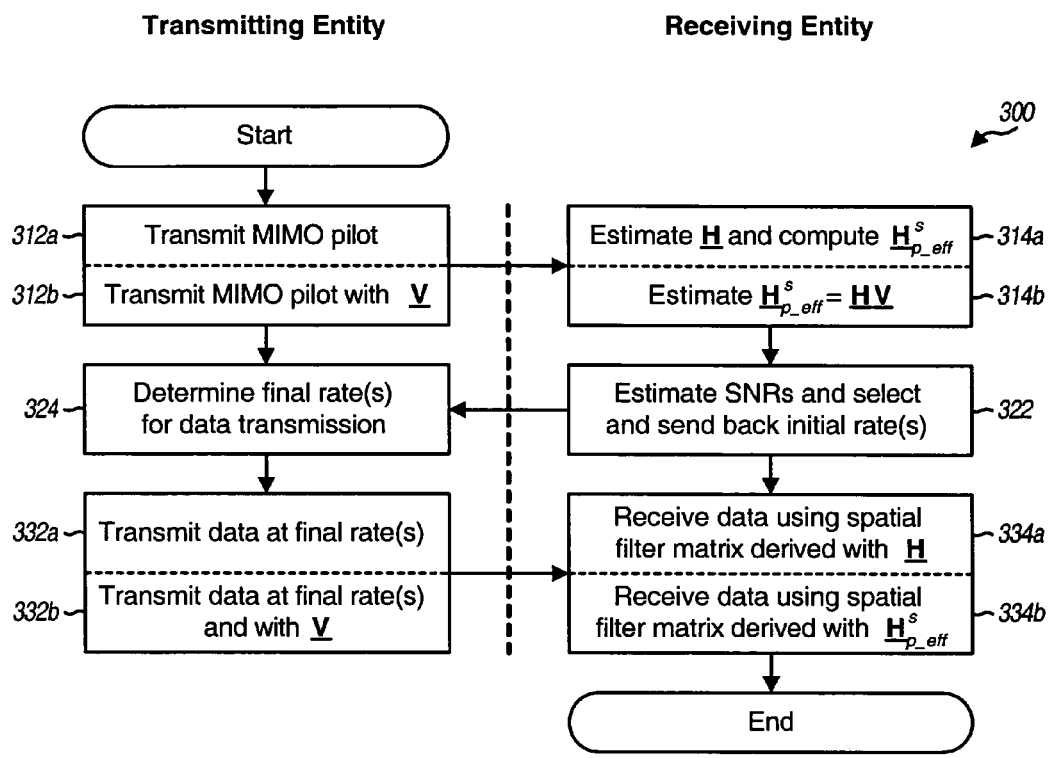
FIG. 3 shows a process to transmit data/pilot for partial channel state information (partial-CSI) transmission.

FIG. 3 shows a flow diagram of a process 300 to transmit data and pilot for partial-CSI transmission. The transmitting entity may transmit a MIMO pilot without STD (block 312a) or a MIMO pilot with STD (block 312b). A MIMO pilot is a pilot comprised of $N_T$ pilot transmissions sent from $N_T$ transmit antennas, with the pilot transmission from each transmit antenna being identifiable by the receiving entity. This may be achieved, for example, by (1) using a different orthogonal sequence for the pilot transmission from each transmit antenna or (2) sending the $N_T$ pilot transmissions from the $N_T$ transmit antennas in different subbands and/or symbol periods. A MIMO pilot may be transmitted with STD by performing spatial processing with steering matrices $\underline{V}$, in the same manner as for data.

The receiving entity may derive an estimate of $\underline{H}$ based on a MIMO pilot sent without STD (block 314a) or an estimate of $\underline{H}_{p\_eff}^s$ based on a MIMO pilot sent with STD (block 314b). To improve the quality of the channel estimate, the receiving entity may filter $\underline{H}$ or $\underline{H}_{p\_eff}^s$ matrices obtained for the current and prior frames using a finite impulse response (FIR) filter, an infinite impulse response (IIR) filter, or some other type of filter. The filtering may be performed separately on each of The receiving entity also estimates the SNRs of the data channels, selects one or more "initial" rates to use for data transmission based on the SNRS, and sends the initial rate(s) back to the transmitting entity (block 322). The SNR estimation and rate selection may be performed as described below. The transmitting entity receives the initial rate(s) and determines one or more "final" rates to use for data transmission to the receiving entity (block 324). The final rate(s) may be equal to the initial rate(s) or an adjusted version of the initial rate(s), e.g., to account for the age of the channel estimate.

The transmitting entity may transmit data by performing (1) no spatial processing (or equivalently, spatial processing with the identity matrix $\underline{I}$) for partial-CSI transmission without STD (step 332a) or (2) spatial processing with steering matrices $\underline{V}$ for partial-CSI transmission with STD (step 332b). Data is transmitted at the final rate(s) determined by the transmitting entity. The receiving entity may receive the data transmission with a spatial filter matrix derived based on $\underline{H}$ for partial-CSI transmission without STD (block 334a) or a spatial filter matrix derived based on $\underline{H}_{p\_eff}^s$ for partial-CSI transmission with STD (block 334b). The transmitting entity may transmit pilot and data concurrently. For example, the MIMO pilot transmission in block 312a/b may occur at the same time as the data transmission in block 332a/b. In this case, the SNR estimation and rate selection may be based on a MIMO pilot sent in a prior frame.

For full-CSI transmission, the transmitting and receiving entities both (directly or indirectly) obtain the eigenmode matrix $\underline{E}$. This may be achieved in various manners. For example, the transmitting entity may transmit a MIMO pilot, and the receiving entity may obtain an estimate of $\underline{H}$, perform eigenvalue decomposition to obtain $\underline{E}$, and send $\underline{E}$ back to the transmitting entity. For a time-division duplex (TDD) system, a high degree of correlation normally exists between the downlink and uplink channel responses since these links share the same frequency band. If the differences between the responses of the transmit/receive chains at both entities can be determined and accounted for via calibration, then the calibrated downlink and uplink channel responses may be assumed to be reciprocal (or transpose) of each other. This may be given as $\underline{H}_{up} = \underline{H}_{dn}^T$, where $\underline{H}_{dn}$ is a channel response matrix for the downlink and $\underline{H}_{up}$ is a channel response matrix for the uplink. For a reciprocal MIMO channel, a steered pilot or steered reference may be sent via one link and used to estimate the eigenmode matrix for the other link. A steered pilot is a pilot sent on the eigenmodes of the MIMO channel.

Figure 4:
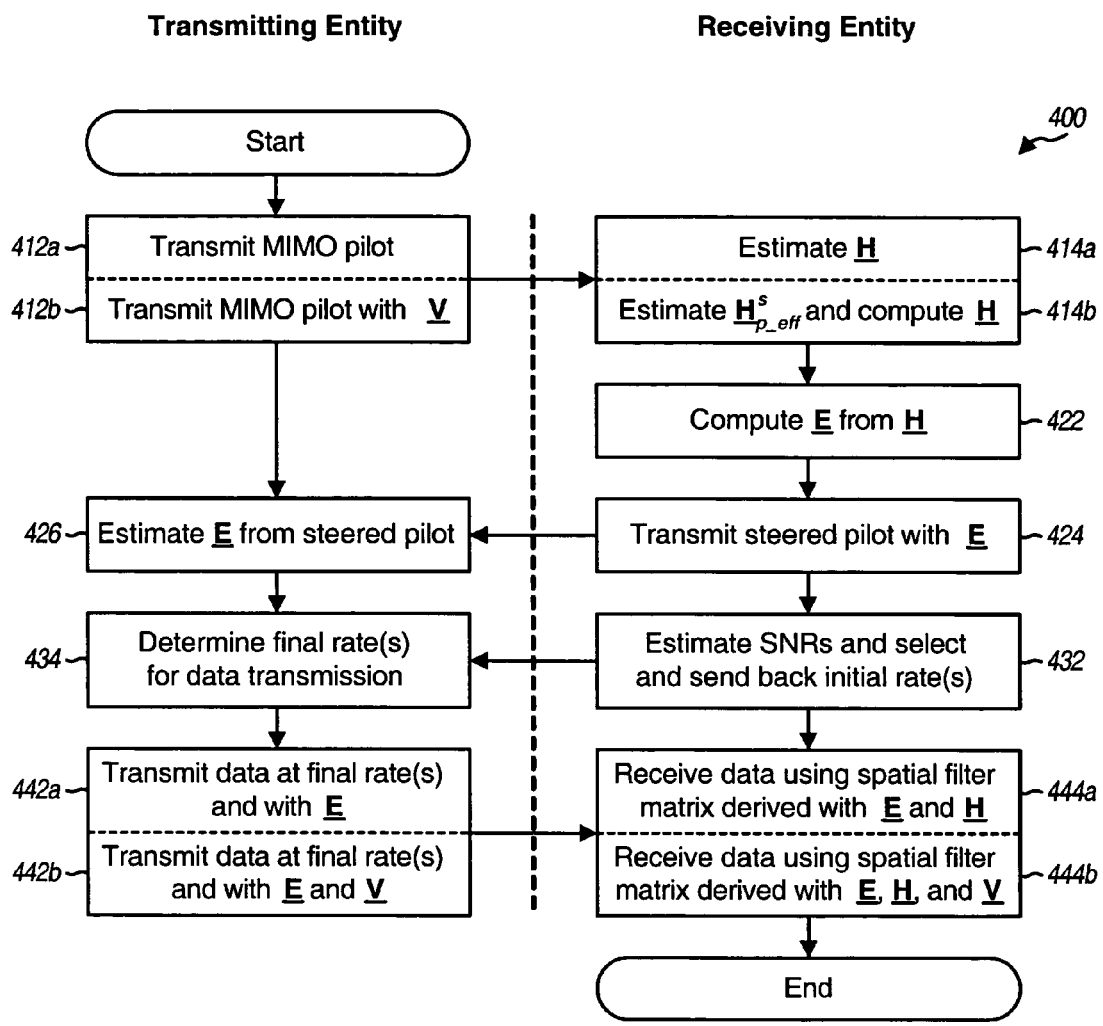
FIGS. 4 and 5 show two processes to transmit data/pilot for full-CSI transmission.

FIG. 4 shows a flow diagram of a process 400 for transmitting data and pilot for full-CSI transmission in the TDD MIMO system. In the following description, the terms "transmitting entity" and "receiving entity" are for data transmission (and not necessarily for pilot transmission). The transmitting entity may transmit a MIMO pilot without STD (block 412a) or a MIMO pilot with STD (block 412b). The receiving entity may derive an estimate of $\underline{H}$ (block 414a) or an estimate of $\underline{H}_{p\_eff}^{s}$ (block 414b) based on the MIMO pilot. The receiving entity may derive $\underline{H}$ from $\underline{H}_{p\_eff}^{s}$ as $\underline{H} = \underline{H}_{p\_eff}^{s} \cdot \underline{V}^H$ (block 414b). The receiving entity computes $\underline{E}$ from $\underline{H}$ (block 422) and transmits a steered pilot using $\underline{E}$ (block 424). The transmitting entity estimates $\underline{E}$ from the received steered pilot (block 426).

The receiving entity also estimates the SNRs of the data channels, selects one or more initial rates, and sends back the initial rate(s) (block 432). The transmitting entity receives the initial rate(s) and determines the final rate(s) (block 434).

The transmitting entity may transmit data with $\underline{E}$ for full-CSI transmission without STD (block 442a) or with both $\underline{E}$ and $\underline{V}$ for full-CSI transmission with STD (block 442b). The receiving entity receives the data transmission by performing full-CSI or MMSE processing with $\underline{E}$ and $\underline{H}$ for full-CSI transmission without STD (block 444a) or with $\underline{E}$, $\underline{H}$, and $\underline{V}$ for full-CSI transmission with STD (block 444b).

Figure 5:
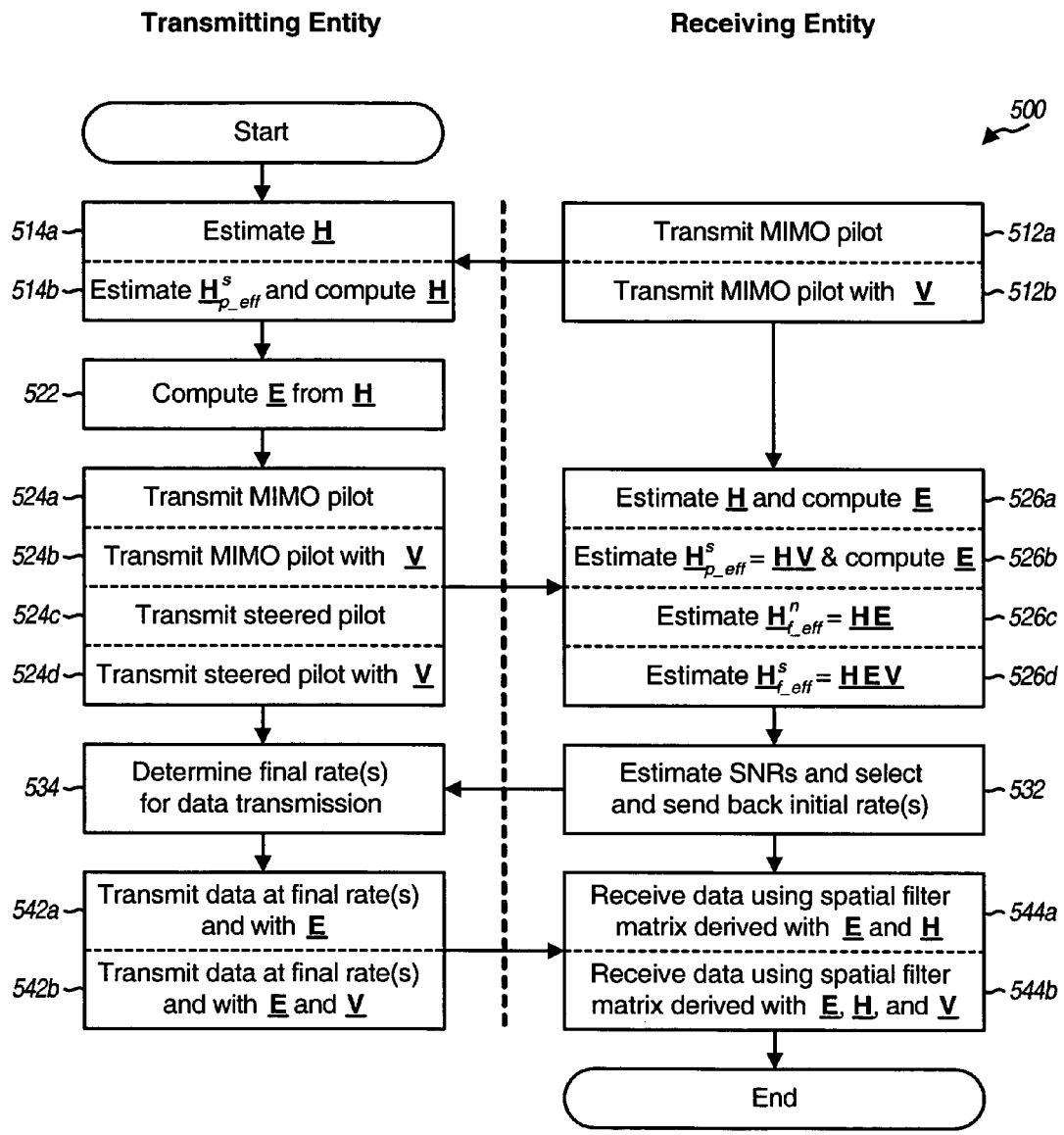

FIG. 5 shows a flow diagram of another process 500 for transmitting pilot and data for full-CSI transmission in the TDD MIMO system. The receiving entity may transmit a MIMO pilot without STD (block 512a) or a MIMO pilot with STD (block 512b). The transmitting entity may derive an estimate of $\underline{H}$ (block 514a) or $\underline{H}_{p\_eff}^{s}$ (block 514b) based on the received MIMO pilot. The transmitting entity then computes $\underline{E}$ from $\underline{H}$, which may be derived from $\underline{H}_{p\_eff}^{s}$ (block 522). The transmitting entity may transmit a MIMO pilot without STD (block 524a), a MIMO pilot with STD (block 524b), a steered pilot without STD (block 524c), or a steered pilot with STD (block 524d). The same or different $\underline{V}$ may be used for the downlink and uplink, but are known by both entities regardless. The receiving entity may obtain $\underline{H}$ (block 526a) or $\underline{H}_{p\_eff}^{s}$ (block 526b) based on a received MIMO pilot or may obtain $\underline{E}$ (block 526c) or $\underline{H}_{f\_eff}^{s}$ (block 526d) based on a received steered pilot.

The receiving entity also estimates the SNRs of the data channels based on the received MIMO or steered pilot, selects one or more initial rates, and sends back the initial rate(s) (block 532). The transmitting entity receives the initial rate(s) and determines the final rate(s) (block 534).

The transmitting entity may transmit data with $\underline{E}$ for full-CSI transmission without STD (block 542a) or with $\underline{E}$ and $\underline{V}$ for full-CSI transmission with STD (block 542b). The receiving entity receives the data transmission with $\underline{E}$ and $\underline{H}$ for full-CSI transmission without STD (block 544a) or with $\underline{E}$, $\underline{H}$, and $\underline{V}$ for full-CSI transmission with STD (block 544b).

FIGS. 3 through 5 show some exemplary data and pilot transmission schemes for the MIMO system. In general, data and pilot may be transmitted in various manners, which may be different from that described above. FIGS. 3 through 5 also indicate that a MIMO pilot may be transmitted with or without STD for all operating modes.

4. SNR Computation and Rate Selection

The receiving entity may estimate the SNR of a data transmission received from the transmitting entity. The SNR is dependent on the type of spatial processing performed by both the transmitting and receiving entities.

For the full-CSI technique, the SNR of each eigenmode for full-CSI transmission without STD may be expressed as:

$$\gamma_{fcsi,i}(m) = \frac{P_i(m) \cdot \lambda_i(m)}{\sigma^2}, \text{ for } i = 1 \ldots N_S, \quad \text{Eq (19)}$$

where $P_i(m)$ is the transmit power used for the symbol sent on the i-th eigenmode in transmission span m;

$\lambda_i(m)$ is the eigenvalue for the i-th eigenmode in transmission span m, which is the i-th diagonal element of $\underline{\Lambda}(m)$; and $\gamma_{fcsi,i}(m)$ is the SNR of the i-th eigenmode in transmission span m.

For the MMSE technique, the SNR of each spatial channel for full-CSI or partial-CSI transmission without STD may be expressed as:

$$\gamma_{x\_mmse,i}(m) = \frac{q_{x,ii}(m)}{1 - q_{x,ii}(m)} \cdot P_i(m), \text{ for } i = 1 \ldots N_S, \quad \text{Eq (20)}$$

where $q_{x,ii}(m)$ is the i-th diagonal element of $\underline{D}_{x\_mmse}^{n}(m)$; and $\gamma_{x\_mmse,i}(m)$ is the SNR for the i-th spatial channel in transmission span m.

For the MMSE technique, the SNR for full-CSI transmission, $\gamma_{f\_mmse,i}(m)$, may be obtained based on the diagonal elements of $\underline{D}_{f\_mmse}^{n}(m)$, and the SNR for partial-CSI transmission, $\gamma_{p\_mmse,i}(m)$, may be obtained based on the diagonal elements of $\underline{D}_{p\_mmse}^{n}(m)$. $\underline{D}_{f\_mmse}^{n}(m)$ and $\underline{D}_{p\_mmse}^{n}(m)$ may be derived as shown in Table 2.

For the CCMI technique, the SNR of each spatial channel for partial-CSI transmission without STD may be expressed as:

$$\gamma_{ccmi,i}(m) = \frac{P_i(m)}{r_{ii}(m) \cdot \sigma^2}, \text{ for } i = 1 \ldots N_S, \quad \text{Eq (21)}$$

where $r_{ii}(m)$ is the i-th diagonal element of $[\underline{H}^H \cdot \underline{H}]^{-1}$; and $\gamma_{ccmi,i}(m)$ is the SNR for the i-th spatial channel in transmission span m.

For all four operating modes, the SNR of each data/spatial channel with the SIC technique may be computed based on the spatial filter matrix $\underline{M}^l(m)$ used to recover the data symbol stream is $\{s_l\}$ sent on that data/spatial channel. The matrix $\underline{M}^l(m)$ is derived using, e.g., the CCMI, MMSE, or some other technique, and further based on a reduced channel response matrix $\underline{H}^l(m)$ applicable for the stage in which data symbol stream $\{s_l\}$ is recovered. Since $\underline{H}^l(m)$ is different for each stage, the SNR of each spatial channel is also typically different. In general, the SNR improves for later stages if the interference from all data symbol streams recovered in prior stages can be effectively estimated and canceled.

In the above equations, the quantity $P_i(m)/\sigma^2$ is the SNR of the received symbols in $\underline{r}(m)$ prior to the spatial matched filtering and is commonly called the "received" SNR. The quantities $\gamma_{fcsi,i}(m)$, $\gamma_{x\_mmse,i}(m)$, and $\gamma_{ccmi,i}(m)$ are the SNRs of the filtered symbols in $\hat{z}(m)$ after the spatial matched filtering for full-CSI or partial-CSI transmission and are also called the "post-detection" SNRs. In the following description, "SNR" refers to post-detection SNR unless noted otherwise.

As shown in equations (19) through (21), the SNR can vary across the $N_S$ spatial channels. If a data symbol stream is transmitted on $N_S$ spatial channels with STD, then that data symbol stream would observe an average SNR for all $N_S$ spatial channels. Each data symbol stream may be sent at a rate that is selected such that a target level of performance (e.g., 1 percent packet error rate (PER)) can be achieved for that stream. Rate selection for the $N_S$ data symbol streams may be performed in various manners.

In an exemplary rate selection scheme, the rate for the data symbol streams is determined as follows. The SNR $\gamma_i(m)$ (in linear units) of each spatial channel is first determined, and the average SNR $SNR_{avg}(m)$ (in decibels (dB)) is computed for all $N_S$ spatial channels for each transmission span m. The average SNR of the MIMO channel, $SNR_{avg}$, may be computed by averaging $SNR_{avg}(m)$ over multiple transmission spans. The variance of the SNRs, $\sigma_{SNR}^2$ is computed as follows:

$$\sigma_{SNR}^2 = \frac{1}{N_F - 1} \sum_{m=1}^{N_F} (SNR(m) - SNR_{avg})^2. \qquad \text{Eq (22)}$$

An SNR back-off factor, $SNR_{bo}$, which is used to account for estimation error, variability in the MIMO channel, and other factors, may be determined, e.g., based on a function of $SNR_{avg}$ and $\sigma_{SNR}^2$. For example, a function $F(SNR_{avg}, \sigma_{SNR}^2) = K_b \cdot \sigma_{SNR}^2$ may be used, where $K_b$ is a scaling factor that may be selected based on one or more characteristics of the MIMO system. An operating SNR, $SNR_{op}$, is next computed as follows:

$$SNR_{op} = SNR_{avg} - SNR_{bo} \qquad \text{Eq (23)}$$

The suitable rate is then selected for data transmission based on the operating SNR. The MIMO system may support a specific set of rates, and each "rate" may be associated with a particular data rate, a particular coding scheme or code rate, a particular modulation scheme, and a particular minimum SNR required to achieve a specified level of performance, e.g., 1% PER for a non-fading AWGN channel. The required SNR for each non-zero rate may be determined by computer simulation, empirical measurements, and so on, based on the system design (e.g., the code rate, interleaving scheme, and modulation scheme used for that rate) and for an AWGN channel. The set of supported rates and their required SNRs may be stored in a look-up table. The operating SNR may be provided to the look-up table, which then returns a suitable rate for that operating SNR. This rate is associated with the highest data rate and a required SNR that is less than or equal to the operating SNR, or $SNR_{req} \leq SNR_{op}$.

An exemplary rate selection scheme has been described above. Various other rate selection schemes may also be used, and this is within the scope of the invention.

The use of STD can provide various benefits besides transmit/spatial diversity. First, STD results in the $N_S$ data symbol streams observing the same SNR statistics at the receiving entity. This can simplify the rate selection and the data processing (e.g., coding and modulation) for these streams. Second, STD improves the robustness of the system since rate selection per spatial channel is not necessary. Instead, each data symbol stream may be transmitted based on the average SNR of the MIMO channel, which typically varies more slowly than the SNR of each spatial channel. Third, SID may improve performance for spatial multiplexing (which is parallel transmission on multiple spatial channels) for mobility scenarios.

5. MIMO System

The multiple operating modes described above may be used for single-carrier and multi-carrier MIMO systems. Multiple carriers may be obtained with orthogonal frequency division multiplexing (OFDM), discrete multi tone (DMT), some other multi-carrier modulation techniques, or some other construct. OFDM effectively partitions the overall system bandwidth into multiple (NF) orthogonal subbands, which are also referred to as tones, subcarriers, bins, and frequency channels. With OFDM, each subband is associated with a respective subcarrier that may be modulated with data.

The multiple operating modes may also be used for TDD and frequency division duplex (FDD) MIMO systems. For an FDD MIMO system, the downlink and uplink are allocated separate frequency bands, and channel estimation may be performed separately for each link. For a TDD MIMO system, the downlink and uplink share the same frequency band, and channel estimation may be performed in a manner to take advantage of the correlation between the downlink and uplink, as described above. The multiple operating modes may also be used for both the downlink and uplink.

Figure 6:
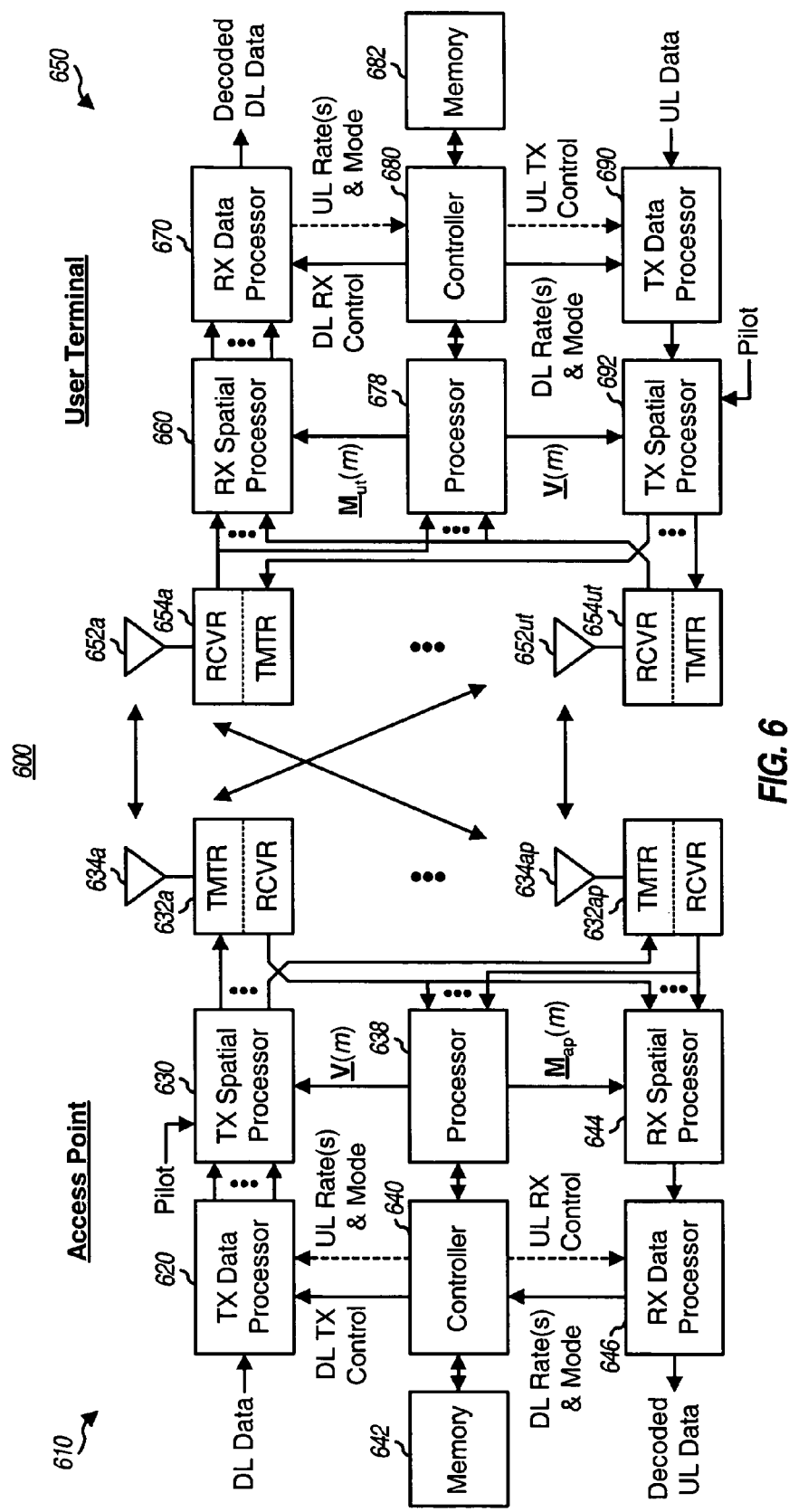
FIG. 6 shows a block diagram of an access point and a user terminal.

FIG. 6 shows a block diagram of an access point 610 and a user terminal 650 in a MIMO system 600. Access point 610 is equipped with $N_{ap}$ antennas, and user terminal 650 is equipped with $N_{ut}$ antennas, where $N_{ap} = N_T > 1$ and $N_{ut} = N_R > 1$.

On the downlink, at access point 610, a TX data processor 620 receives traffic/packet and control/overhead data for the downlink, processes (e.g., encodes, interleaves, and modulates) the data in accordance with one or more rate(s) selected for the downlink, and provides data symbols. A TX spatial processor 630 performs spatial processing on the data symbols in accordance with an operating mode selected for the downlink, multiplexes in pilot symbols as appropriate, and provides $N_{ap}$ streams of transmit symbols to $N_{ap}$ transmitter units 632a through 632ap. Each transmitter unit 632 receives and conditions a respective transmit symbol stream to generate a corresponding downlink modulated signal. $N_{ap}$ downlink modulated signals from transmitter units 632a through 632ap are sent from $N_{ap}$ antennas 634a through 634ap, respectively.

At user terminal 650, $N_{ut}$ antennas 652a through 652ut receive the transmitted downlink modulated signals, and each antenna provides a received signal to a respective receiver unit 654. Each receiver unit 654 performs processing complementary to that performed by receiver unit 632 and provides received symbols. An RX spatial processor 660 performs receiver spatial processing on the received symbols from all $N_{ut}$ receiver units 654a through 654ut based on spatial filter matrices $M_{ut}(m)$ for the downlink and provides detected data symbols. The spatial filter matrices are derived in accordance with the selected operating mode and the selected receiver spatial processing technique. An RX data processor 670 processes (e.g., symbol demaps, deinterleaves, and decodes) the detected data symbols and provides decoded data for the downlink.

The processing for the uplink may be the same or different from the processing for the downlink. At user terminal 650, traffic and control data for the uplink is processed (e.g., encoded, interleaved, and modulated) by a TX data processor 690 based on one or more rate(s) selected for the uplink, further spatially processed by a TX spatial processor 692 in accordance with an operating mode selected for the uplink, and multiplexed with pilot symbols to generate $N_{ut}$ transmit symbol streams. $N_{ut}$ transmitter units 654a through 654ut condition the $N_{ut}$ transmit symbol streams to generate $N_{ut}$ uplink modulated signals, which are sent via $N_{ut}$ antennas 652a through 652ut. At access point 610, the uplink modulated signals are received by $N_{ap}$ antennas 634 and processed by $N_{ap}$ receiver units 632 to obtain received symbols for the uplink. An RX spatial processor 644 performs receiver spatial processing on the received symbols with spatial filter matrices $\underline{M}_{ap}(m)$ for the uplink and provides detected data symbols, which are further processed by an RX data processor 646 to obtain decoded data.

Processors 638 and 678 perform channel estimation, spatial filter matrix computation, and rate selection for the access point and user terminal, respectively. Controllers 640 and 680 control the operation of various processing units at the access point and user terminal, respectively. Memory units 642 and 682 store data and program codes used by controllers 640 and 680, respectively.

Data may be processed and transmitted on the $N_S$ data channels in each link in various manners. For simplicity, the data sent on each data channel is referred to as a data stream. $N_D$ data streams may be sent simultaneously on $N_D$ data channels, where $1 \leq N_D \leq N_S$. The $N_D$ data streams may carry different data packets, or a given data packet may be sent on multiple data channels. If STD is not employed, then the $N_D$ data streams may observe different SNRs, and different rates may be used for these streams. If STD is employed, then the $N_D$ data streams observe similar SNRs, and the same rate may be used for all streams. The selected rate for each data stream determines the coding and modulation schemes used for the data stream. The following description assumes that all $N_S$ data channels are used for data transmission, and $N_D = N_S$.

Figure 7:
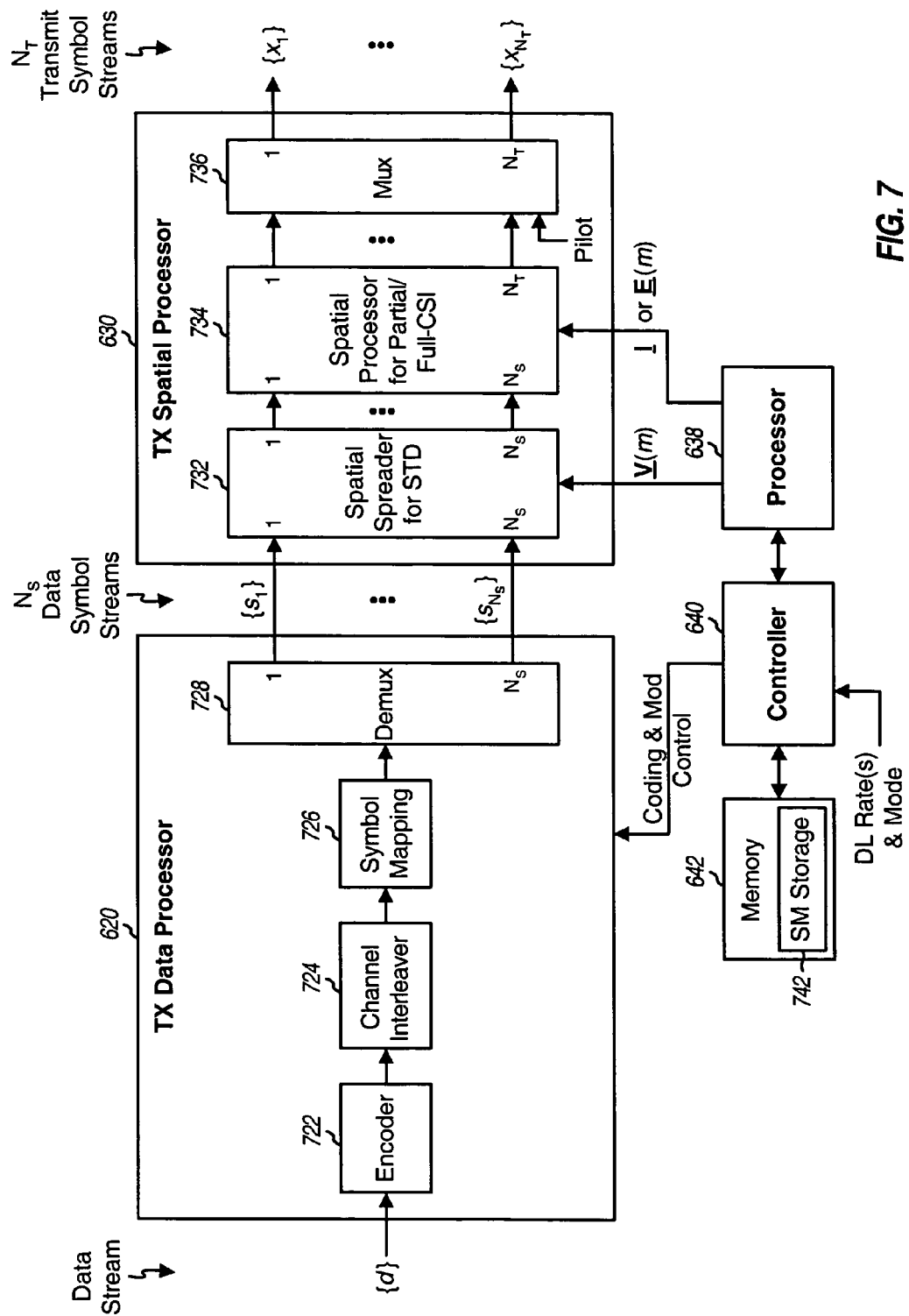
FIG. 7 shows a transmit (TX) data processor and a TX spatial processor.

FIG. 7 shows a block diagram of an embodiment of TX data processor 620 and TX spatial processor 630 at access point 610. For this embodiment, one data stream is processed and sent on $N_D$ data channels using STD.

Within TX data processor 620, an encoder 722 receives and encodes each data packet based on a coding scheme and provides a corresponding code block or coded data packet. The coding scheme may include a Turbo code (e.g., as defined by IS-856), a low density parity check (LDPC) code, a convolutional code, and so on. A channel interleaver 724 interleaves (i.e., reorders) code bits from encoder 722 to achieve frequency, time, and/or spatial diversity. A symbol mapping unit 726 maps the interleaved bits based on a modulation scheme and provides data symbols. Unit 726 groups each set of B interleaved bits to form a B-bit binary value, where $B \geq 1$, and further maps each B-bit binary value to a specific modulation symbol based on the modulation scheme (e.g., QPSK, M-PSK, or M-QAM, where $M=2^B$). Unit 726 provides a block of data symbols for each data packet. A demultiplexer (Demux) 728 receives and demultiplexes the data symbols into $N_S$ data symbol streams, one data symbol stream for each data channel.

If STD is employed, then a spatial spreader 732 within TX spatial processor 630 performs spatial spreading on the $N_S$ data symbol streams with steering matrices $\underline{V}(m)$ and provides $N_S$ spread symbol streams. The steering matrices may be retrieved from a steering matrix (SM) storage 742 within memory unit 642 or generated by processor 638 as they are needed. If STD is not employed, then spatial spreader 732 simply passes the $N_S$ data symbol streams.

A spatial processor 734 spatially processes the $N_S$ spread/data symbol streams with the identity matrix $\underline{I}$ for partial-CSI transmission and with the eigenmode matrix $\underline{E}(m)$ for full-CSI transmission. A multiplexer 736 multiplexes the transmit symbols from spatial processor 734 with pilot symbols and provides $N_{ap}$ transmit symbol streams for the $N_{ap}$ transmit antennas.

Figure 8:
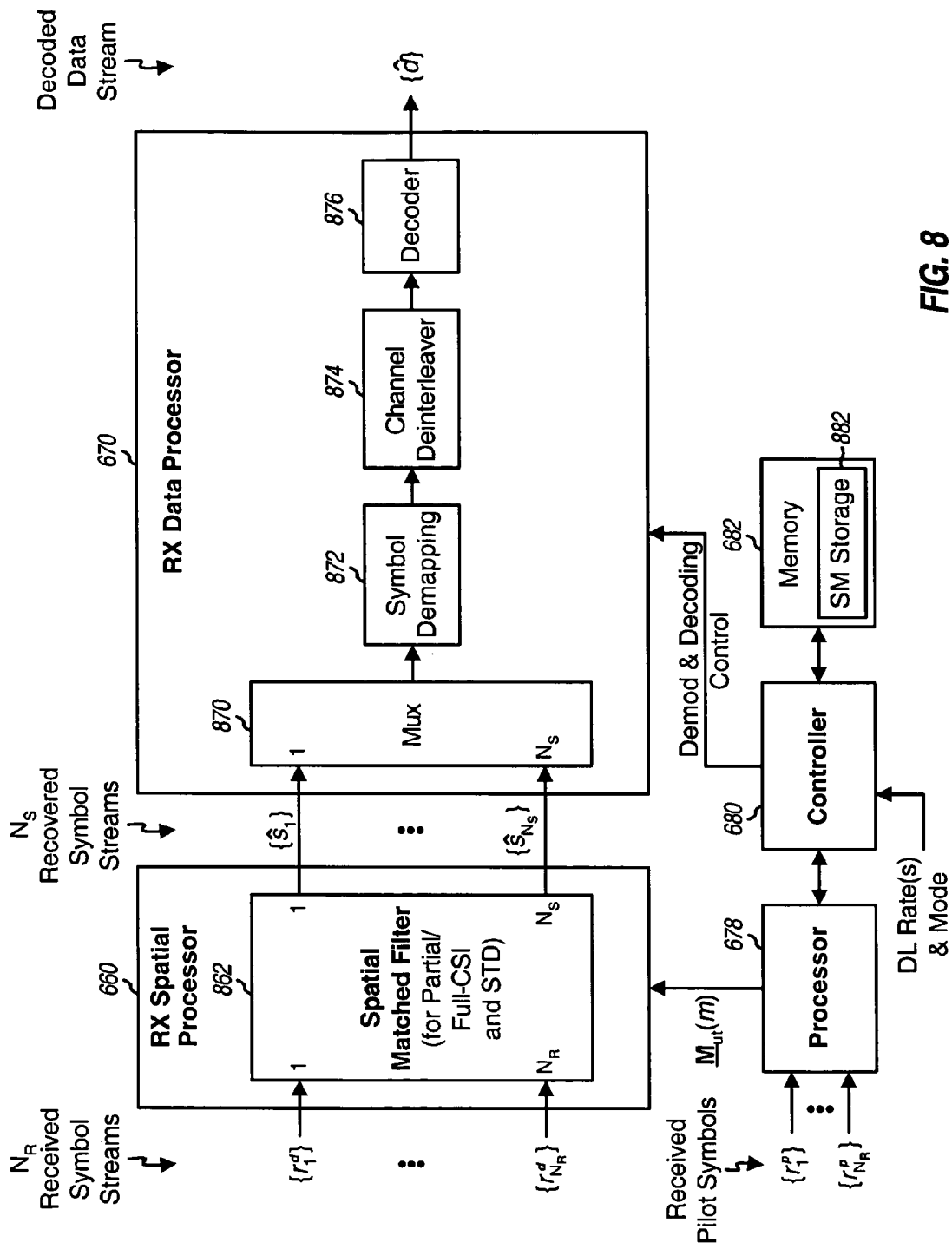
FIG. 8 shows a receive (RX) spatial processor and an RX data processor.

FIG. 8 shows a block diagram of an embodiment of RX spatial processor 660 and RX data processor 670 at user terminal 650. $N_{ut}$ receiver units 654 provide received data symbols, $\{r_i^d\}$ for $i=1 \ldots N_R$, to RX spatial processor 660 and received pilot symbols, $\{r_i^p\}$ for $i=1 \ldots N_R$, to processor 678. RX spatial processor 660 performs receiver spatial processing on the received data symbols for each transmission span m with the spatial filter matrix $\underline{M}_{ut}(m)$ and provides detected data symbols to RX data processor 670. Within RX data processor 670, a multiplexer 870 multiplexes the $N_S$ detected symbol streams for the $N_S$ data channels. A symbol demapping unit 872 demodulates the detected data symbols in accordance with the modulation scheme used by access point 610 and provides demodulated data. A channel deinterleaver 874 deinterleaves the demodulated data in a manner complementary to the interleaving performed by access point 610. A decoder 876 decodes the deinterleaved data in a manner complementary to the encoding performed by access point 610. For example, a Turbo decoder or a Viterbi decoder may be used for decoder 876 if Turbo or convolutional coding, respectively, is performed by access point 610. Decoder 876 provides a decoded data stream containing a decoded data packet for each code block.

Figure 9:
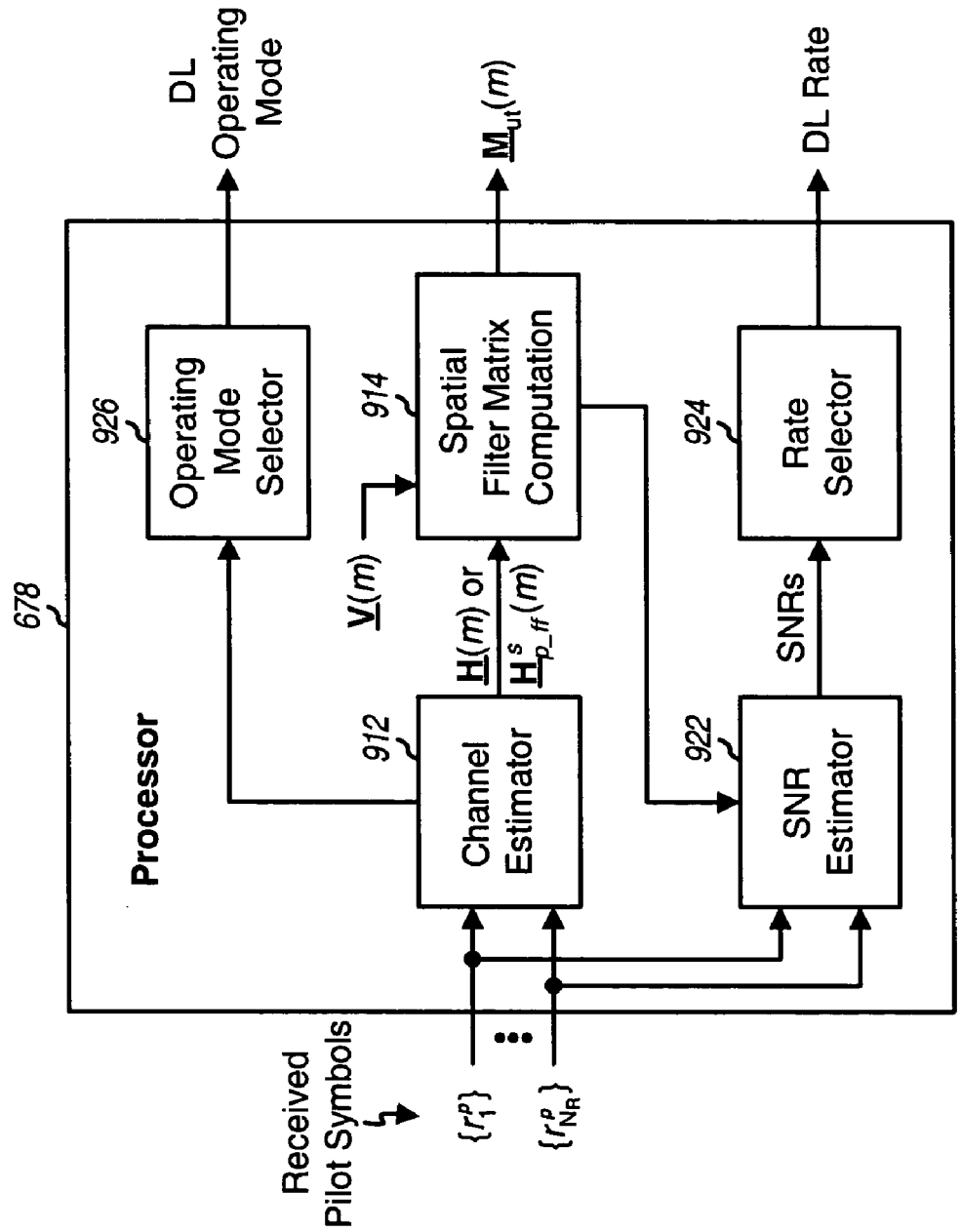
FIG. 9 shows a processor for selecting rate(s) and operating mode.

FIG. 9 shows an embodiment of processor 678, which performs channel estimation, spatial filter matrix computation, and rate selection for user terminal 650. A channel estimator 912 estimates the actual or effective channel response matrix for each transmission span m in which received pilot symbols are available. A computation unit 914 derives a spatial filter matrix $\underline{M}_{ut}(m)$ for each transmission span m (e.g., as shown in Table 2). The MMSE technique may be used for all four operating modes to simplify the receiver design.

An SNR estimator 922 estimates the SNR of each data channel based on the received pilot symbols and in accordance with the selected receiver processing technique. A rate selector 924 selects appropriate initial rate(s) for data transmission on the downlink based on the SNR estimates. An operating mode selector 926 selects an appropriate operating mode for the downlink. Referring back to FIG. 6, user terminal 650 may select the initial rate(s) and operating mode (or simply, "mode") for the downlink (DL) and send the DL rate(s)/mode to access point 610, which may transmit data using the DL rate(s) and mode. Similarly, access point 610 may select the rate(s) and operating mode for the uplink (UL) and send the UL rate(s) and mode to user terminal 650, which may transmit data on the uplink using the UL rate(s) and mode.

The processing units for uplink data transmission may be similar to those used for downlink data transmission. The channel estimation and spatial filter matrix computation may be the same or different for the downlink and uplink, depending on the channel structure and pilot transmission scheme used for the system.

Figure 10:
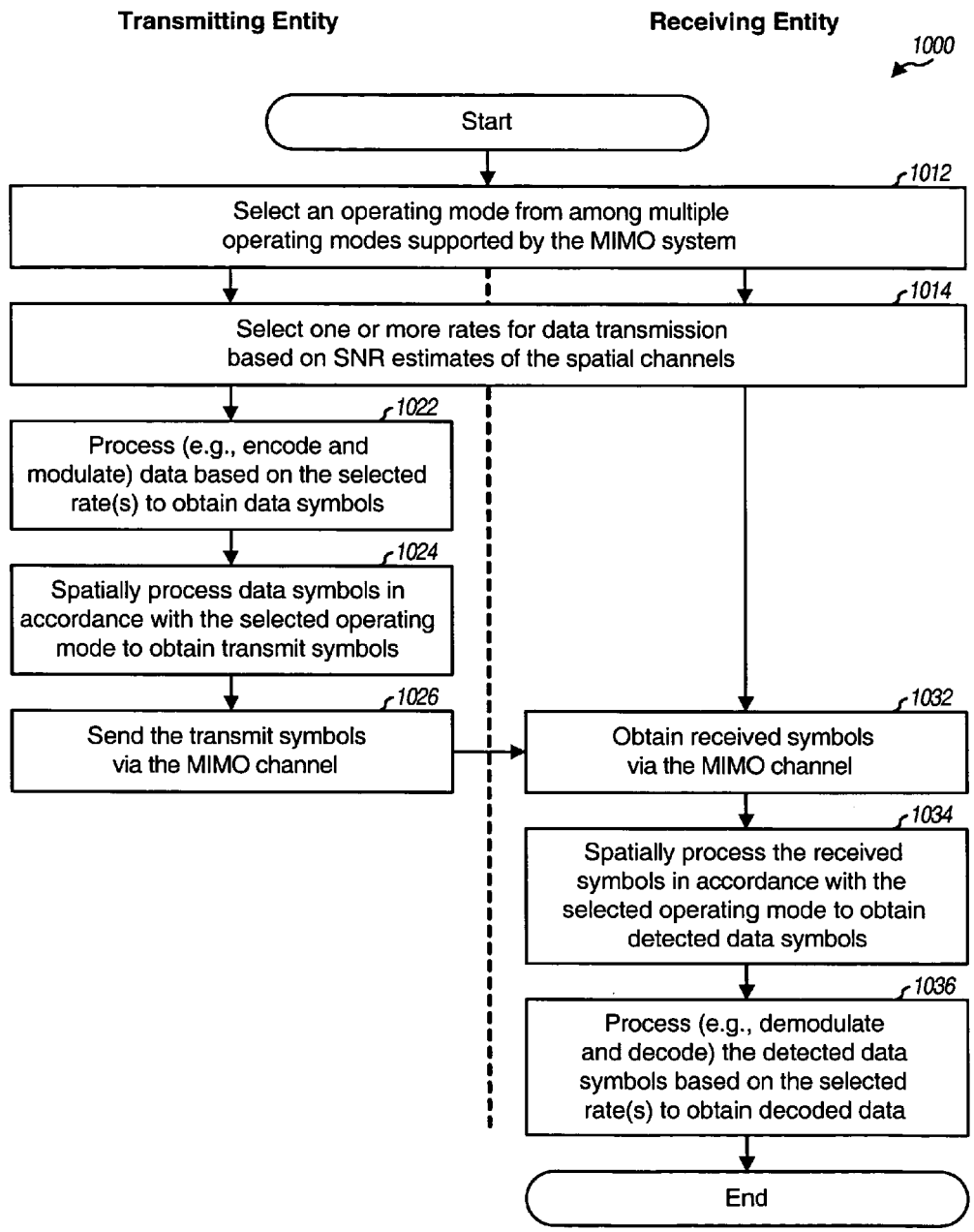
FIG. 10 shows a process to transmit and receive data in the MIMO system.

FIG. 10 shows a flow diagram of a process 1000 to transmit and receive data in the MIMO system. Initially, an operating mode is selected from among multiple operating modes supported by the system (block 1012). The operating mode may be selected based on various factors such as, for example, the availability of a reasonably accurate channel estimate, the MIMO channel conditions, the SNR estimates, the capability of the transmitting and receiving entities, and so on. One or more rates are also selected for data transmission (block 1014). One rate may be used for all data channels with STD, and different rates may be used for different data channels without STD. The transmitting entity and/or receiving entity may jointly or separately select the operating mode and rate(s). In any case, both entities are informed of the selected operating mode and rate(s).

The transmitting entity then processes data in accordance with the selected rate(s) to obtain data symbols (block 1022). The transmitting entity further spatially processes the data symbols in accordance with the selected operating mode to obtain transmit symbols (block 1024) and transmits the transmit symbols via the MIMO channel. The receiving entity obtains received symbols (block 1032) and performs receiver spatial processing on the received symbols in accordance with the selected operating mode to obtain detected data symbols (block 1034). The receiving entity further processes the detected data symbols based on the selected rate(s) to obtain decoded data (block 1036).

6. Steering Matrices for Steering Transmit Diversity

A set of steering matrices may be generated and used for STD. These steering matrices may be denoted as $\{\underline{V}\}$, or $\underline{V}(i)$ for $i=1 \ldots L$, where L may be any integer greater than one. Each steering matrix $\underline{V}(i)$ should be a unitary matrix. This condition ensures that the $N_T$ data symbols transmitted simultaneously using $\underline{V}(i)$ have the same power and are orthogonal to one another after the spatial spreading with $\underline{V}(i)$.

The set of L steering matrices may be generated in various manners. For example, the L steering matrices may be generated based on a unitary base matrix and a set of scalars. The base matrix may be used as one of the L steering matrices. The other L−1 steering matrices may be generated by multiplying the rows of the base matrix with different combinations of scalars. Each scalar may be any real or complex value. The scalars are selected to have unit magnitude so that steering matrices generated with these scalars are unitary matrices.

The base matrix may be a Walsh matrix. A 2×2 Walsh matrix $\underline{W}_{2\times 2}$ and a larger size Walsh matrix $\underline{W}_{2N\times 2N}$ may be expressed as:

$$\underline{W}_{2\times 2} = \begin{bmatrix} 1 & 1 \\ 1 & -1 \end{bmatrix} \text{ and } \underline{W}_{2N\times 2N} = \begin{bmatrix} \underline{W}_{N\times N} & \underline{W}_{N\times N} \\ \underline{W}_{N\times N} & -\underline{W}_{N\times N} \end{bmatrix}. \quad \text{Eq (24)}$$

Walsh matrices have dimensions that are powers of two (e.g., 2, 4, 8, and so on).

The base matrix may also be a Fourier matrix. For an N×N Fourier matrix $\underline{D}_{N\times N}$, the element $d_{n,m}$ in the n-th row and m-th column of $\underline{D}_{N\times N}$ may be expressed as:

$$d_{n,m} = e^{-j2\pi \frac{(n-1)(m-1)}{N}}, \text{ for } n = \{1 \ldots N\} \text{ and } m = \{1 \ldots N\}. \quad \text{Eq (25)}$$

Fourier matrices of any square dimension (e.g., 2, 3, 4, 5, and so on) may be formed. Other matrices may also be used as the base matrix.

For an N×N base matrix, each of rows 2 through N of the base matrix may be independently multiplied with one of K different possible scalars. $K^{N-1}$ different steering matrices may be obtained from $K^{N-1}$ different permutations of the K scalars for N−1 rows. For example, each of rows 2 through N may be independently multiplied with a scalar of +1, −1, +j, or −j, where $j=\sqrt{-1}$. In general, each row of the base matrix may be multiplied with any scalar having the form $e^{j\theta}$, where θ may be any phase value. Each element of a scalar-multiplied N×N base matrix is further scaled by $1/\sqrt{N}$ to obtain an N×N steering matrix having unit power for each column.

Steering matrices derived based on a Walsh matrix (or a 4×4 Fourier matrix) have certain desirable properties. If the rows of the Walsh matrix are multiplied with scalars of ±1 and ±j, then each element of a resultant steering matrix $\underline{V}(i)$ belongs in a set composed of $\{+1, -1, +j, -j\}$. In this case, the multiplication of an element of another matrix with an element of $\underline{V}(i)$ may be performed with just bit manipulation.

The data transmission techniques described herein may be implemented by various means. For example, these techniques may be implemented in hardware, software, or a combination thereof. For a hardware implementation, the processing units at the transmitting entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at the receiving entity may also be implemented within one or more ASICs, DSPs, and so on.

For a software implementation, the data transmission techniques may be implemented with modules (e.g., procedures, functions, and so on) that perform the functions described herein. The software codes may be stored in memory units (e.g., memory units 642 and 682 in FIG. 6) and executed by a processor (e.g., controllers 640 and 680 in FIG. 6). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving data in a multiple-input multiple-output (MIMO) communication system, comprising:
   obtaining an effective channel response matrix for an effective MIMO channel observed by data symbols sent by a transmitting entity, wherein the system supports a plurality of operating modes, each operating mode being associated with different spatial processing on the data symbols by the transmitting entity, and wherein the effective MIMO channel includes a MIMO channel used for data transmission and the spatial processing, if any, performed by the transmitting entity on the data symbols;
   deriving a spatial filter matrix based on the effective channel response matrix and in accordance with a minimum mean square error (MMSE) technique; and
   performing spatial processing on symbols received via the MIMO channel with the spatial filter matrix to obtain estimates of the data symbols sent by the transmitting entity.

2. The method of claim 1, wherein the plurality of operating modes include an operating mode supporting data transmission on one or more spatial channels without any spatial processing by the transmitting entity, and wherein the effective channel response matrix is for the MIMO channel used for data transmission.

3. The method of claim 1, wherein the plurality of operating modes include an operating mode supporting data transmission on one or more spatial channels with steering transmit diversity, and wherein the effective channel response matrix comprises a channel response matrix for the MIMO channel and a steering matrix used for the steering transmit diversity.

4. The method of claim 1, wherein the plurality of operating modes include an operating mode supporting data transmission on one or more orthogonal spatial channels, and wherein the effective channel response matrix comprises a channel response matrix for the MIMO channel and an eigenmode matrix used to transmit the data symbols on the one or more orthogonal spatial channels.

5. The method of claim 1, wherein the plurality of operating modes include an operating mode supporting data transmission on one or more orthogonal spatial channels with steering transmit diversity, and wherein the effective channel response matrix comprises a channel response matrix for the MIMO channel, an eigenmode matrix used to transmit the data symbols on the one or more orthogonal spatial channels, and a steering matrix used for the steering transmit diversity.

6. The method of claim 1, wherein the spatial filter matrix is derived based on the following equation for the MMSE technique:

$$\underline{M}_{mmse} = [\underline{H}_{eff}^H \cdot \underline{H}_{eff} + \sigma^2 \cdot \underline{I}]^{-1} \cdot \underline{H}_{eff}^H,$$

where $\underline{H}_{eff}$ is the effective channel response matrix;
$\underline{I}$ is an identity matrix;
$\underline{M}_{mmse}$ is the spatial filter matrix;
$\sigma^2$ is variance of noise; and
"$H$" as is a conjugate transpose.

7. An apparatus in a wireless multiple-input multiple-output (MIMO) communication system, comprising:
a first processor operative to obtain an effective channel response matrix for an effective MIMO channel and to derive a spatial filter matrix based on the effective channel response matrix and in accordance with a minimum mean square error (MMSE) technique, wherein the system supports a plurality of operating modes, each operating mode being associated with different spatial processing on data symbols by a transmitting entity, and wherein the effective MIMO channel is observed by the data symbols sent by the transmitting entity and includes a MIMO channel used for data transmission and the spatial processing, if any, performed by the transmitting entity on the data symbols; and
a spatial processor operative to perform spatial processing on symbols received via the MIMO channel with the spatial filter matrix to obtain estimates of the data symbols sent by the transmitting entity.

8. The apparatus of claim 7, wherein the plurality of operating modes include an operating mode supporting data transmission on one or more spatial channels without any spatial processing by the transmitting entity, and wherein the effective channel response matrix is for the MIMO channel used for data transmission.

9. The apparatus of claim 7, wherein the plurality of operating modes include an operating mode supporting data transmission on one or more orthogonal spatial channels, and wherein the effective channel response matrix comprises a channel response matrix for the MIMO channel and an eigenmode matrix used to transmit the data symbols on the one or more orthogonal spatial channels.

10. An apparatus in a wireless multiple-input multiple-output (MIMO) communication system, comprising:
means for obtaining an effective channel response matrix for an effective MIMO channel observed by data symbols sent by a transmitting entity, wherein the system supports a plurality of operating modes, each operating mode being associated with different spatial processing on the data symbols by the transmitting entity, and wherein the effective MIMO channel includes a MIMO channel used for data transmission and the spatial processing, if any, performed by the transmitting entity on the data symbols;
means for deriving a spatial filter matrix based on the effective channel response matrix and in accordance with a minimum mean square error (MMSE) technique; and
means for performing spatial processing on symbols received via the MIMO channel with the spatial filter matrix to obtain estimates of the data symbols sent by the transmitting entity.

11. The apparatus of claim 10, wherein the plurality of operating modes include an operating mode supporting data transmission on one or more spatial channels without any spatial processing by the transmitting entity, and wherein the effective channel response matrix is for the MIMO channel used for data transmission.

12. The apparatus of claim 10, wherein the plurality of operating modes include an operating mode supporting data transmission on one or more orthogonal spatial channels, and wherein the effective channel response matrix comprises a channel response matrix for the MIMO channel and an eigenmode matrix used to transmit the data symbols on the one or more orthogonal spatial channels.

13. A memory appartus encoded with instructions executable by a processor for performing a method of receiving data in a multiple-input multiple-output (MIMO) communication system, the method comprising:
obtaining an effective channel response matrix for an effective MIMO channel observed by data symbols sent by a transmitting entity, wherein the system supports a plurality of operating modes, each operating mode being associated with different spatial processing on the data symbols by the transmitting entity, and wherein the effective MIMO channel includes a MIMO channel used for data transmission and the spatial processing, if any, performed by the transmitting entity on the data symbols;
deriving a spatial filter matrix based on the effective channel response matrix and in accordance with a minimum mean square error (MMSE) technique; and
performing spatial processing on symbols received via the MIMO channel with the spatial filter matrix to obtain estimates of the data symbols sent by the transmitting entity.

14. The apparatus of claim 13, wherein the plurality of operating modes include an operating mode supporting data transmission on one or more spatial channels without any spatial processing by the transmitting entity, and wherein the effective channel response matrix is for the MIMO channel used for data transmission.

15. The apparatus of claim 13, wherein the plurality of operating modes include an operating mode supporting data transmission on one or more orthogonal spatial channels, and wherein the effective channel response matrix comprises a channel response matrix for the MIMO channel and an eigenmode matrix used to transmit the data symbols on the one or more orthogonal spatial channels.

* * * * *